US012732084B2

(12) United States Patent
Chen et al.

(10) Patent No.: US 12,732,084 B2
(45) Date of Patent: Sep. 8, 2026

(54) HIGH POWER FAST TRANSIENT RESPONSE LINEAR CURRENT SENSING TOPOLOGY

(71) Applicant: Alpha and Omega Semiconductor International LP, Toronto (CA)

(72) Inventors: Winway Chen, San Jose, CA (US); Sitthipong Angkititraku, Dublin, CA (US); Li Jiang, San Jose, CA (US); Jian Yin, San Ramon, CA (US)

(73) Assignee: Alpha and Omega Semiconductor International LP, Toronto (CA)

( * ) Notice: Subject to any disclaimer, the term of this patent is extended or adjusted under 35 U.S.C. 154(b) by 152 days.

(21) Appl. No.: 18/733,016

(22) Filed: Jun. 4, 2024

(65) Prior Publication Data

US 2025/0373138 A1 Dec. 4, 2025

(51) Int. Cl.
*H02M 1/00* (2007.01)
*H02M 3/158* (2006.01)

(52) U.S. Cl.
CPC ....... *H02M 1/0009* (2021.05); *H02M 3/1584* (2013.01)

(58) Field of Classification Search
CPC .......................... H02M 1/0009; H02M 3/1584
See application file for complete search history.

(56) References Cited

U.S. PATENT DOCUMENTS

2018/0234012 A1* 8/2018 You ........................ G01R 23/02
2021/0080987 A1* 3/2021 Rodriguez ............ H02M 3/157
2025/0373142 A1* 12/2025 Mazzer ............... H02M 1/0074

* cited by examiner

*Primary Examiner* — Lakaisha Jackson
(74) *Attorney, Agent, or Firm* — Thompson Patent Law Offices PC

(57) ABSTRACT

Apparatus and associated methods relate to a pole-zero balanced power switching regulating system for high power and frequency application. In an illustrative example, a trans-inductor voltage regulator (TLVR) may include at least two phases. For example, each phase may include a current inducing circuit. A second-order current sensing circuit (SOCSC) operably coupled to the TLVR may be configured to measure the current flow of each phase. In some implementations, the TLVR may include a first transfer function with two zeros and one pole and the SOCSC may include a second transfer function with two DCR-poles and one DCR-zero. For example, a difference between corresponding poles and zeros of the first and second transfer functions may effectively cancel each other. For example, a gain and phase difference between the first and the second transfer functions are close to zero. Various embodiments may advantageously allow fast transient current measurement at the TLVR.

20 Claims, 24 Drawing Sheets

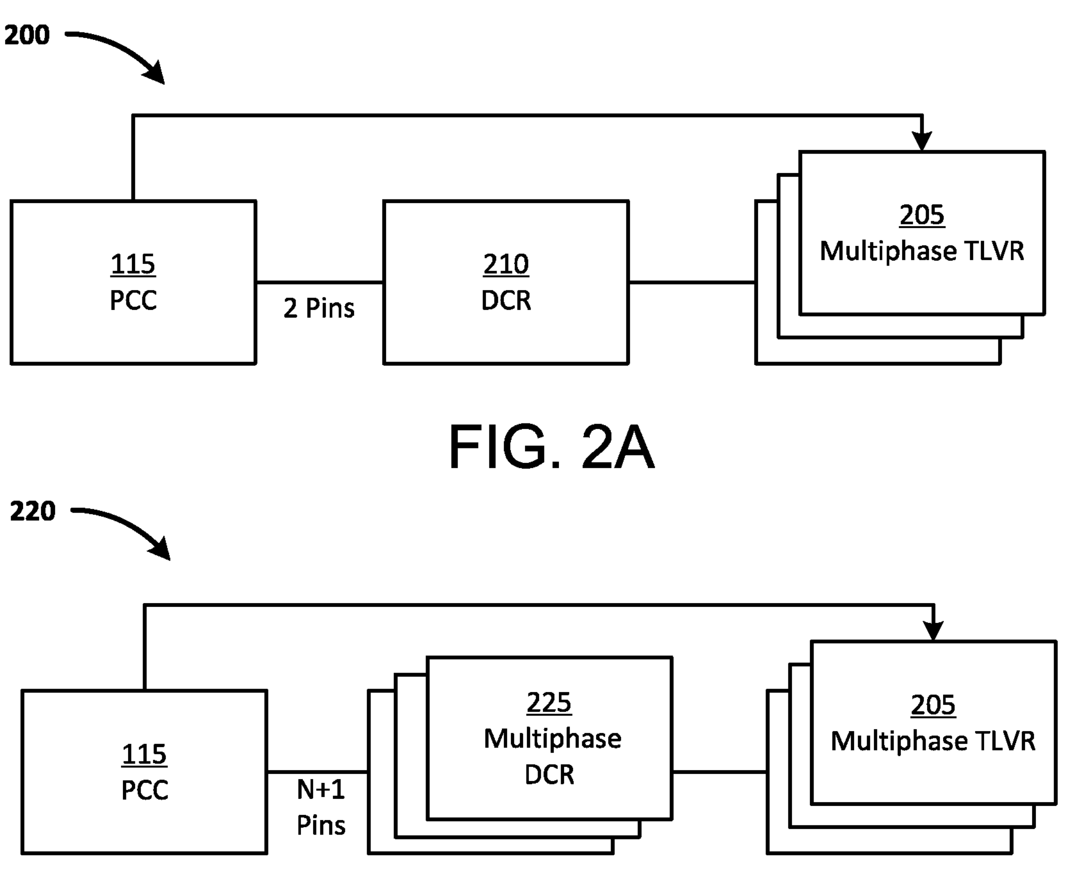
FIG. 2A
FIG. 2B
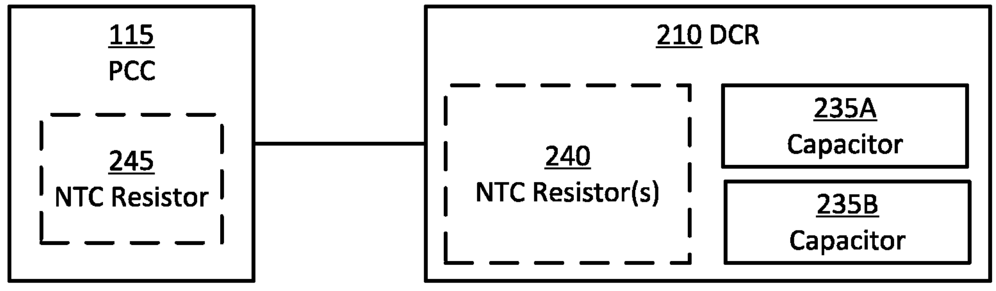
FIG. 2C

| Lc | P1 (kHz) | DCR-Z1 (kHz) | DCR-P1 (kHz) | DCR-P2 (kHz) | Z1 (kHz) | Z2 (kHz) |
|---|---|---|---|---|---|---|
| 0.5*Lm | 0.24 | 0.24 | **0.091** | **1.792** | **0.090** | 1.794 |

HIGH POWER FAST TRANSIENT RESPONSE LINEAR CURRENT SENSING TOPOLOGY

TECHNICAL FIELD

Various embodiments relate generally to electronic circuits for power management.

BACKGROUND

Voltage regulators are essential components in electronic systems, designed to maintain a constant output voltage despite variations in input voltage or changes in load conditions. These devices ensure the stability of electronic circuits by providing a steady power supply, which is crucial for the reliability and performance of sensitive electronic equipment. Their functionality is critical across a broad spectrum of applications, from simple consumer devices to complex industrial machinery.

The TLVR represents a significant advancement in voltage regulation technology. Unlike conventional linear or switching regulators, TLVRs utilize magnetic coupling and inductor-based energy storage to achieve both high efficiency and fast response times. This technology allows for improved power handling capabilities and better adaptation to rapid changes in load, making it especially advantageous in systems requiring precise voltage control under dynamic conditions.

The fast transient response and high efficiency of TLVRs make them well-suited to meet these challenges, ensuring that advanced computational systems and high-performance electric vehicles operate reliably under varying load conditions and diverse environmental factors.

SUMMARY

Apparatus and associated methods relate to a pole-zero balanced power switching regulating system for high power and frequency application. In an illustrative example, a trans-inductor voltage regulator (TLVR) may include at least two phases. For example, each phase may include a current inducing circuit. A second-order current sensing circuit (SOCSC) operably coupled to the TLVR may be configured to measure the current flow of each phase. In some implementations, the TLVR may include a first transfer function with two zeros and one pole and the SOCSC may include a second transfer function with two DCR-poles and one DCR-zero. For example, a difference between corresponding poles and zeros of the first and second transfer functions may effectively cancel each other. For example, a gain and phase difference between the first and the second transfer functions may be close to zero. Various embodiments may advantageously allow fast transient current measurement at the TLVR.

Various embodiments may achieve one or more advantages. For example, some embodiments may be simple to implement and cost effective. Some embodiments, for example, may enhance the reliability of the system by reducing the number of interconnections. For example, some embodiments may advantageously enhance modularity and flexibility (e.g., allowing for easier upgrades and/or replacements). Some embodiments, for example, may advantageously lead to cost savings in production and/or maintenance. For example, some embodiments may advantageously be accurately measuring in-phase current of each phase of the TLVR. Some embodiments, for example, may be temperature compensated.

The details of various embodiments are set forth in the accompanying drawings and the description below. Other features and advantages will be apparent from the description and drawings, and from the claims.

BRIEF DESCRIPTION OF THE DRAWINGS

FIG. 2A, FIG. 2B, and FIG. 2C are block diagrams depicting exemplary power supply units in various embodiments.

Like reference symbols in the various drawings indicate like elements.

DETAILED DESCRIPTION OF ILLUSTRATIVE EMBODIMENTS

To aid understanding, this document is organized as follows. First, to help introduce discussion of various embodiments, a high power fast response system (HiPoFRS) is introduced with reference to FIGS. 1-2C. Second, that introduction leads into a description with reference to FIGS. 3A-C of some exemplary embodiments of a multi-order current sensing circuit. Third, with reference to FIGS. 4A-6, various embodiments and exemplary response are described in application to exemplary multi-order current sensing circuit and trans-inductor voltage regulator. Fourth, with reference to FIGS. 7A-F, the discussion turns to exemplary embodiments that illustrate various implementations of the current sensing circuit having temperature compensation components. Fifth, and with reference to FIG. 8A-9C, this document describes exemplary apparatus and methods useful for regulating control signals using the multi-order current sensing circuit. Sixth, the document introduces an exemplary method in configuring a fast transient response direct current resistance circuit. Finally, the document discusses further embodiments, exemplary applications and aspects relating to the HiPoFRS.

Figure 1:
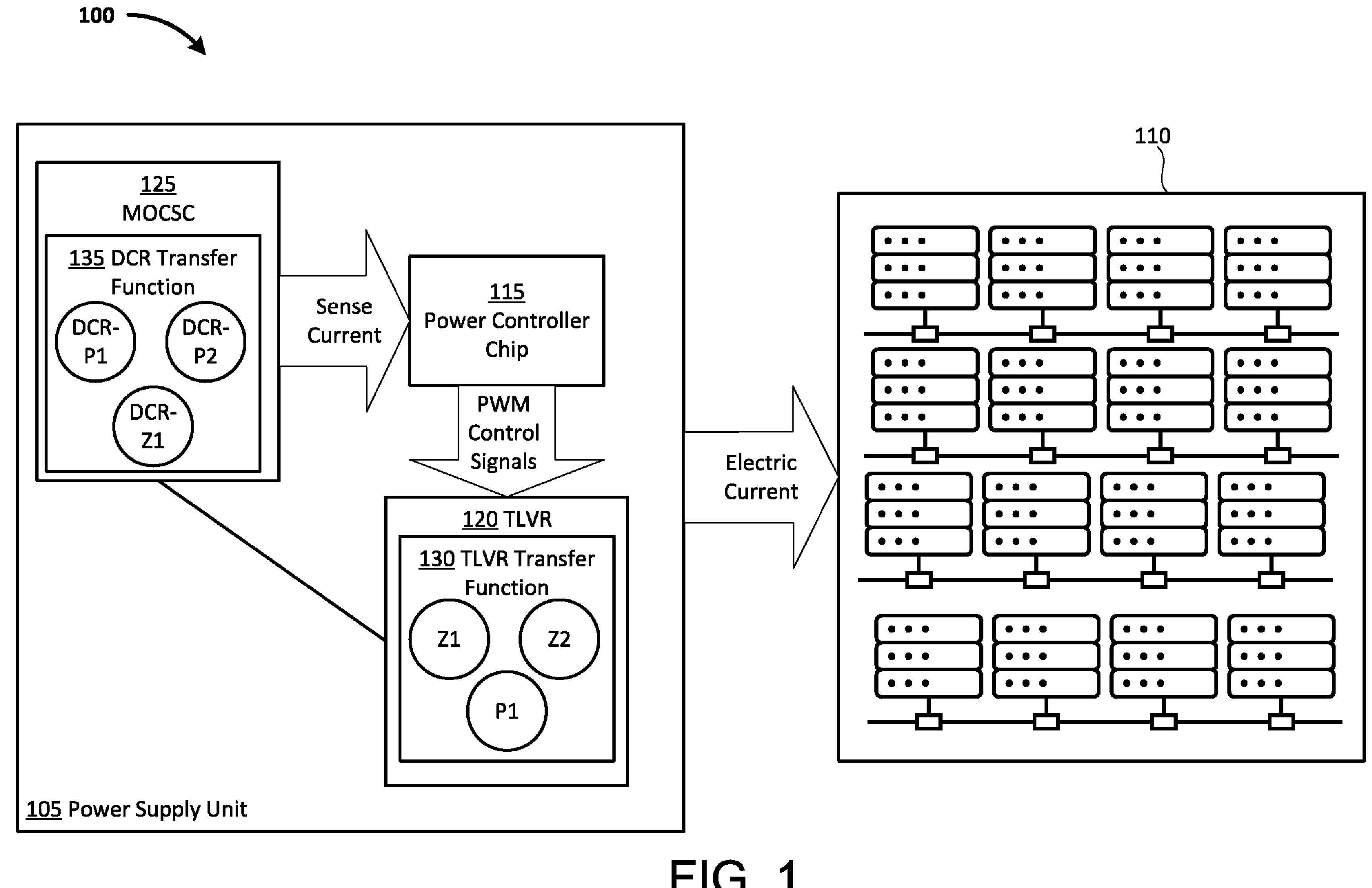
FIG. 1 depicts an exemplary high power fast response system (HiPoFRS) employed in an illustrative use-case scenario.

FIG. 1 depicts an exemplary high power fast response system (HiPoFRS) employed in an illustrative use-case scenario. In this example, a HiPoFRS 100 includes a power supply unit (PSU 105) operably connected to an artificial intelligence processing server (AIPS 110). For example, the AIPS 110 may receive an electric current from the PSU 105. In some implementations, the AIPS 110 may require a heavy current load. For example, the electric current may be larger than 100 A (100 Ampere). For example, the electric current may be larger than 200 A. For example, the electric current may be larger than 500 A. For example, the electric current may be larger than 1000 A. In various implementations, the HiPoFRS 100 may include the PSU 105 connected to other heavy current loads (e.g., electric vehicle, electric tractors, a high performance graphical processing unit (GPU), a data center, a crypto mining rig).

As shown, the PSU 105 includes a power controller chip (PCC 115) and a trans-inductor voltage regulator (TLVR 120). For example, the PCC 115 may be configured to generate control signals to the TLVR 120 to regulate a power supplied to the AIPS 110. For example, the TLVR 120 may include multiple phases to regulate a multiphase current supplied to power the AIPS 110. For example, the AIPS 110 may receive N phases (N is an integer>1) of electric current from the PSU 105 in operation. In some implementations, the AIPS may be configured to receive a single phase current with N=1. The TLVR 120, for example, may include N phases to regulate each N phase of current to be supplied to the AIPS 110. For example, the TLVR 120 may regulate a current flow of each N phases of the electric current to the AIPS 110.

The PCC 115, for example, may generate a pulse width modulation (PWM) signals to the TLVR 120. In some implementations, the PCC 115 may generate the PWM signal based on measurements of current flow at each of the N phases being supplied to the AIPS 110. For example, the PCC 115 may generate the PWM signals based on real-time measurement. For example, the PCC 115 may generate the PWM signals based on an average measurement.

In various implementations, the PCC 115 may include a software based PWM. In some implementations, the PCC 115 may include an analog PWM circuit. Various PWM techniques may be employed to enhance the efficiency and response of the PCC 115. For example, the PCC 115 may include a sinusoidal PWM (SPWM). For example, the PCC 115 may include a space vector PWM (SVPWM). For example, the PCC 115 may include other carrier-based PWM techniques to improve a quality of the output waveform and/or more stable power delivery to sensitive AI processing hardware.

In this example, the PSU 105 includes a multi-order current sensing circuit (MOCSC 125). The MOCSC 125 is operably connected to the TLVR 120. For example, the MOCSC 125 may be configured to measure a current flow within each phase of the TLVR 120. In some implementations, the MOCSC 125 may include a direct current resistance (DCR) current sensing circuit. For example, the DCR current sensing circuit may advantageously be simple to implement and cost effective.

In some embodiments, the MOCSC 125 may be integrated within the TLVR 120 as a single package. For example, integrating the MOCSC 125 and TLVR 120 into a single package may advantageously be saving space on the circuit board. In some examples, the integration may advantageously enhance the reliability of the system by reducing the number of interconnections. For example, a single package solution may advantageously improve electrical performance.

In some embodiments, the MOCSC 125 may be incorporated as a separate package. For example, incorporating the MOCSC 125 as a separate package may advantageously enhance modularity and flexibility (e.g., allowing for easier upgrades and/or replacements). For example, a separate package configuration may advantageously lead to cost savings in production and/or maintenance.

As shown, the TLVR 120 includes a TLVR transfer function 130. For example, the TLVR transfer function 130 may represent a mathematical relationship between input signals (e.g., the PWM control signals) and output signals (e.g., the Multiphase current) of the TLVR 120. In some implementations, the TLVR transfer function 130 may be used to determine a behavior of the TLVR 120 under various operating conditions. For example, the TLVR transfer function 130 may map how voltage and current are modulated across different phases. In this example, the TLVR transfer function 130 is characterized by having two zeros (Z1 and Z2) and one pole (P1). For example, Z1, Z2, and P1 may determine a frequency response of the TLVR 120. For example, Z1 and Z2 may represent attenuating frequencies of the TLVR 120. In some examples, P1 may represent a system instability frequency.

The MOCSC 125 includes a DCR transfer function 135. For example, the DCR transfer function 135 may describe a mathematical relationship between the input signals to the TLVR 120 (e.g., the PWM control signals) and a current sensed by the MOCSC 125. In some implementations, the MOCSC 125 may be specifically engineered as a function of the TLVR transfer function 130. In various embodiments, the DCR transfer function 135 may include two poles (DCR-P1, DCR-P2) and one zero (DCR-Z1). For example, the two poles DCR-P1 and DCR-P2 may effectively cancel the zeros Z1 and Z2, and the zero DCR-Z1 may effectively cancel P1. For example, the magnitude of DCR-P1 and Z1, the magnitude of DCR-P2 and Z2, and the magnitude of P1 and DCR-Z1 may substantially be within a predetermined threshold (e.g., within 1%, within 2%, within 5%). Accordingly, for example, the MOCSC 125 may advantageously measure in-phase current (e.g., the sense current in FIG. 1) of the TLVR 120 without introducing phase lag or gain relative to an original signal (e.g., the current in each phase). For example, the PCC 115 may generate the PWM signals with accurate real-time current monitoring enhancing stability and performance of the HiPoFRS 100.

FIG. 2A, FIG. 2B, and FIG. 2C are block diagrams depicting exemplary power supply units in various embodiments. As shown in FIG. 2A, a PSU 200 includes the PCC 115 operably connected to a multiphase TLVR 205. For example, the multiphase TLVR 205 may be the TLVR 120 configured to supply multi-phase (e.g., >1) power to a load (e.g., the AIPS 110). In this example, the PSU 200 includes a DCR 210 configured to measure a current (e.g., an inductor current) for all phases of the multiphase TLVR 205. For example, the DCR 210 may generate a total sensing current signal across the phases of the multiphase TLVR 205. For example, the DCR 210 may generate a total load current across the phases of the multiphase TLVR 205. For example, the PCC 115 may need a minimum of two pins to receive measurement signals from the DCR 210.

As shown in FIG. 2B, a PSU 220 includes a multiphase DCR 225. For example, the multiphase DCR 225 may include a DCR 210 for each phase of the multiphase TLVR 205. In some examples, the multiphase DCR 225 may generate a sense current for each of the phases of the multiphase TLVR 205 in real-time. For example, the PCC 115 may require at least N+1 pins (N=number of phases of the multiphase TLVR 205) to receive measurement signals from the multiphase DCR 225. In some embodiments, if load current of each phase is to be received, the PCC 115 may require 2*N pins coupled to the multiphase DCR 225.

As shown in FIG. 2C, the DCR 210 may include two capacitors (a capacitor 235A and a capacitor 235B). For example, the capacitor 235A and the capacitor 235B may include the same capacitance value. For example, the capacitor 235A and the capacitor 235B may include different capacitance values. For example, the PSU 200 may include at least two capacitors (the capacitor 235A and the capacitor 235B) at the DCR 210. For example the PSU 220 may include at least N*2 capacitors for each of the N phases of the multiphase DCR 225 (where N is the number of phases of the multiphase TLVR 205).

In some embodiments, the DCR 210 may be configured to be temperature compensated. For example, the DCR 210 may optionally include one or more negative temperature coefficient resistor(s) (NTC resistor(s) 240). For example, the resistor(s) 240 may include a dynamically adjusted resistance as a function of a temperature in the DCR 210. In some embodiments, the DCR 210 may include two NTC resistor(s) 240. In some embodiments, the PCC 115 may optionally include a NTC resistor 245. For example, in this case, the DCR 210 may include one NTC resistor 240, incorporating another temperature compensated resistor in the PCC 115 in its operation.

Figure 3A:
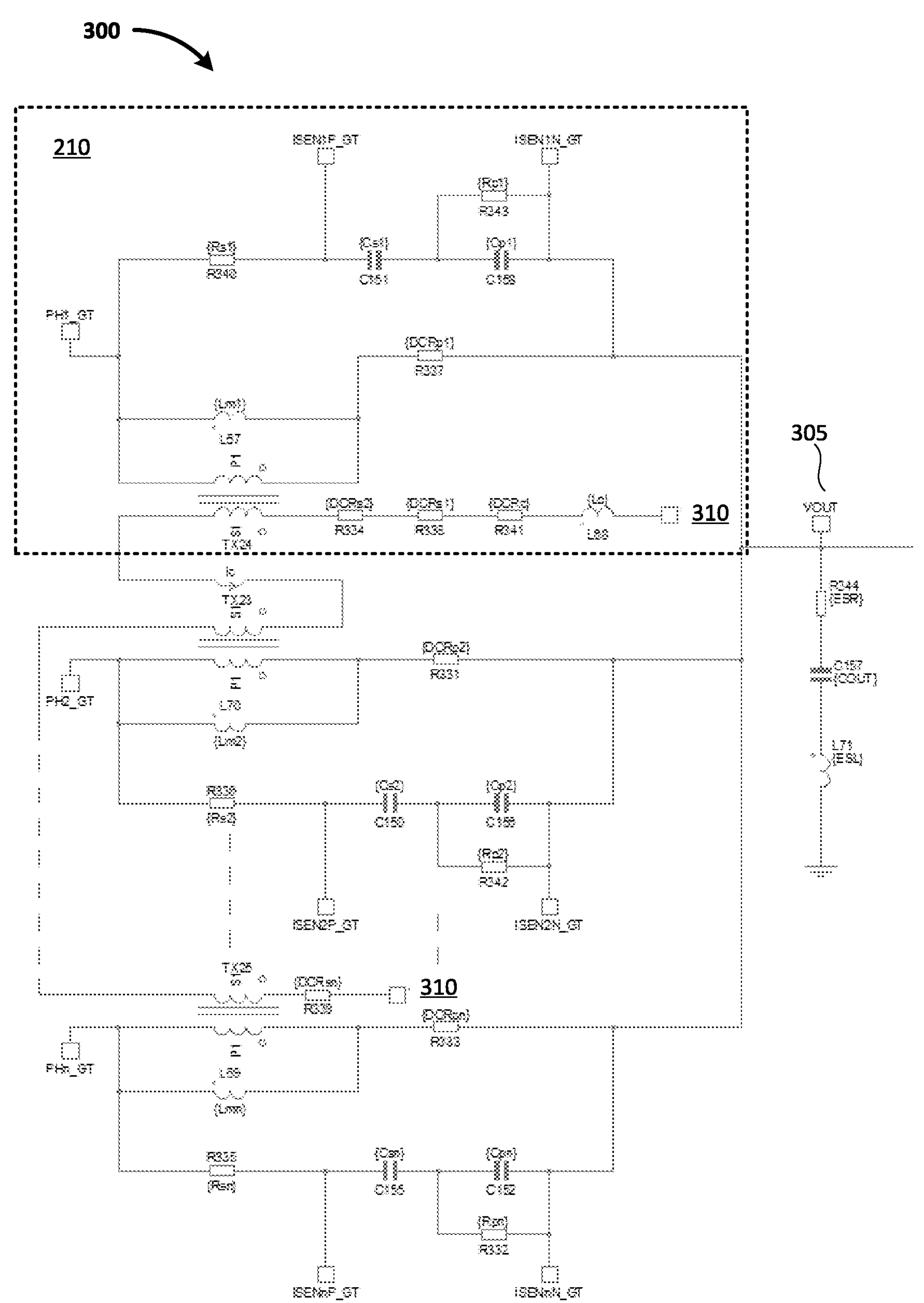
FIG. 3A, FIG. 3B, and FIG. 3C depict an exemplary electrical schematics of a second order direct current resistance (SODCR) circuit on a multiphase trans-inductor voltage regulator (TLVR).
Figure 3B:
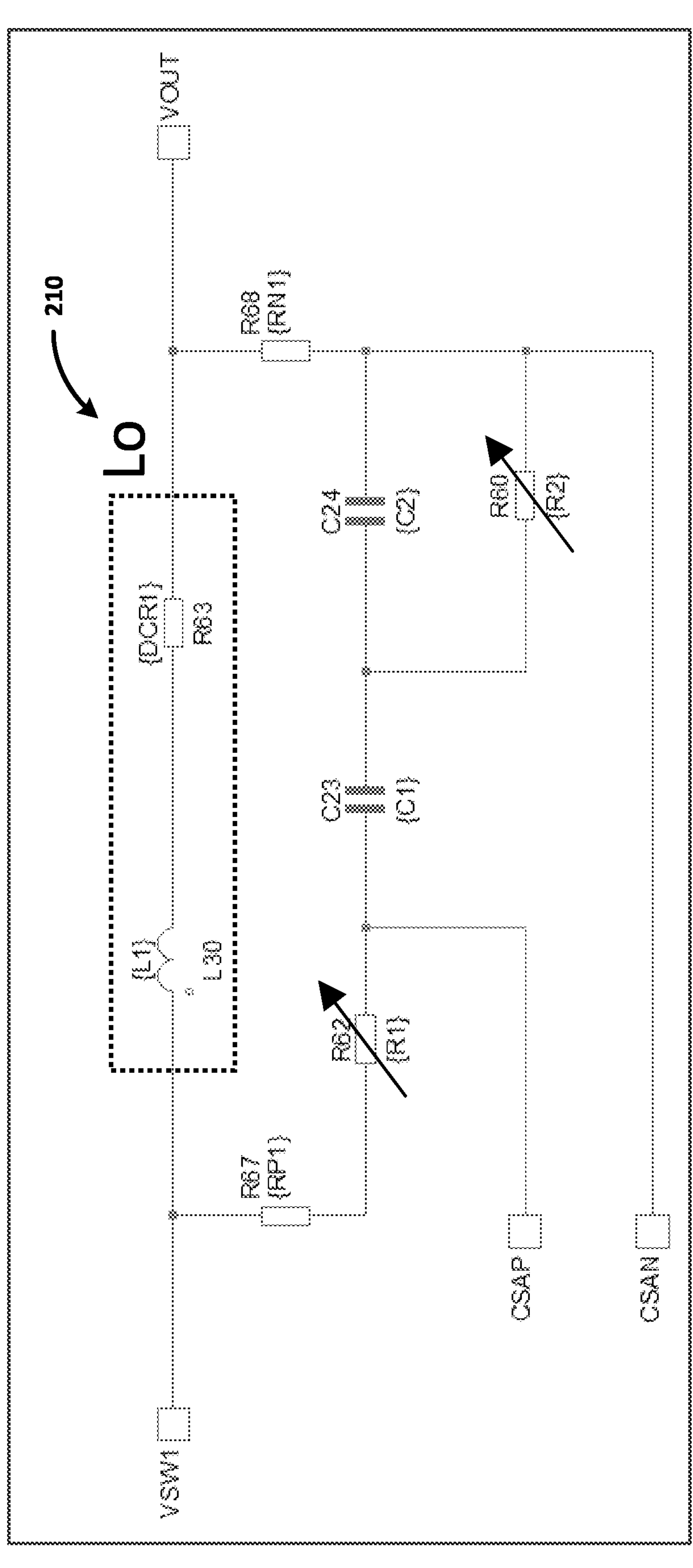
Figure 3C:
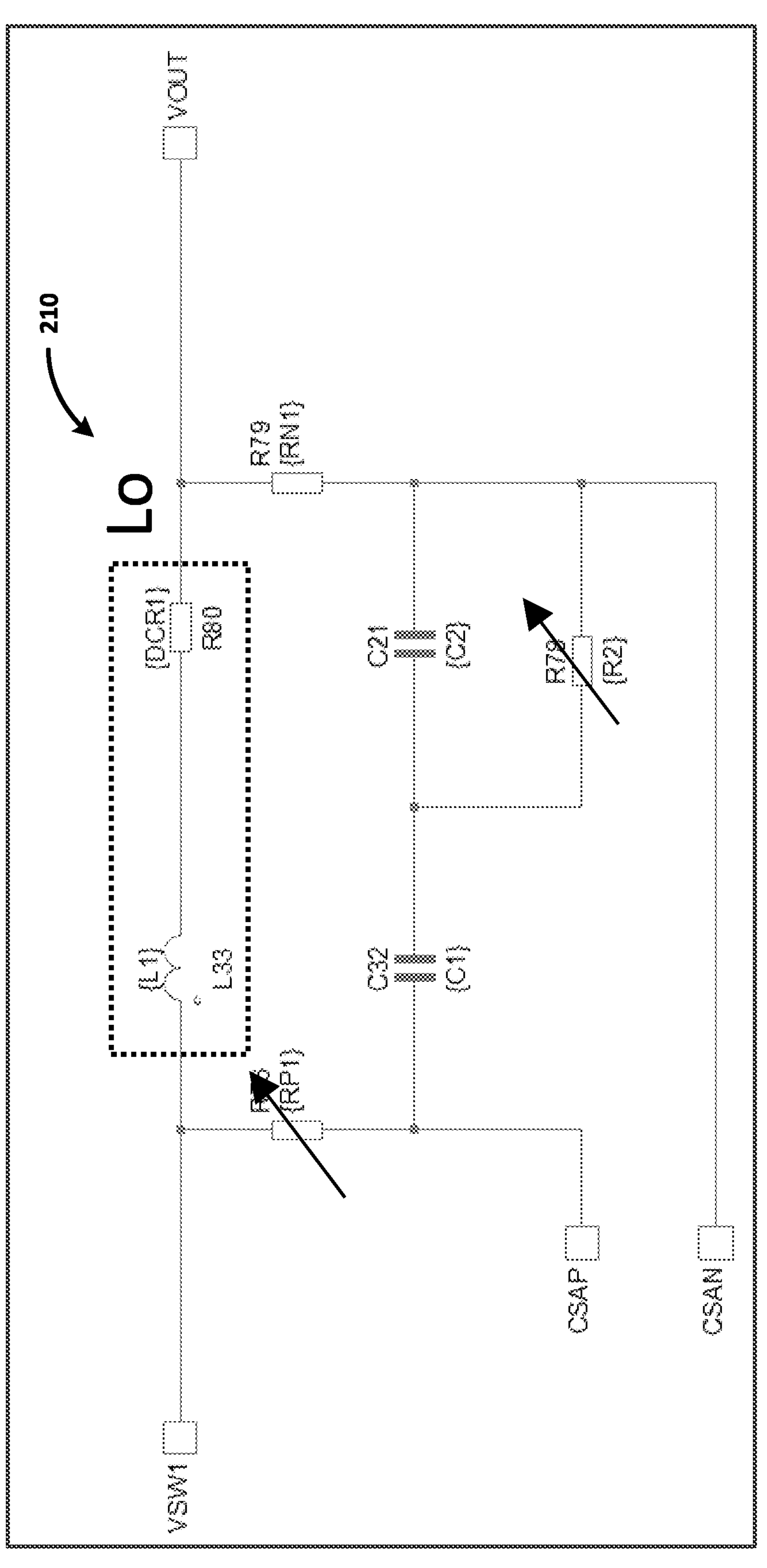

FIG. 3A, FIG. 3B, and FIG. 3C depict an exemplary electrical schematics of a second order direct current resistance (SODCR) circuit on a multiphase trans-inductor voltage regulator (TLVR). In this example, as shown in FIG. 3A, a TLVR 300 includes N phases controlled by control signals received at PH1_GT, PH2_GT, . . . PHn_GT). For example, the TLVR may include a voltage output at Vout 305. As shown, the TLVR 300 includes the multiphase DCR 225 that includes N DCR 210 to measure a trans-inductor current of each phase (Lm1, . . . Lmn). In this example, each phase of the N phases may include a reference terminal 310. For example, the reference terminal 310 operably coupled to a compensation inductor connected at a secondary side of the transformer. In some embodiments, the reference terminal 310 may be connected to a ground terminal. In some embodiments, the reference terminal 310 may be connected to the Vout 305. For example, the reference terminal 310 may be connected to other reference voltage terminals.

As shown in FIG. 3B, the DCR 210 includes a DCR (DCR1). For example, the DCR 210 may generate a voltage difference at terminals CSAP and CSAN. In some examples, an inductor current Lo may be determined based on the voltage difference. In some embodiments, the DCR 210 may include the DCR transfer function 135 configured by resistance and capacitance value of electric components RDCR-P1, R1, C1, C2, R2, and RN1. In various embodiments, these values may be configured such that the two poles and one zero of the DCR transfer function 135 matches the one pole and two zeros of the TLVR transfer function 130. In this example, the resistors R1 and R2 are temperature compensated (e.g., NTC resistors). In some embodiments, the R1 and R2 may be configured to balance variation in response to the TLVR 120 based on temperature variations.

In various examples, the resistors RP1 and RN1 may be included in a circuit of the TLVR 120. In some embodiments, as shown in FIG. 3C, the DCR 210 may include only one NTC resistor R2. In this example, the resistor RP1 is temperature compensated. For example, the DCR transfer function 135 of the DCR 210 may be determined by C1, C2, RP1, RN1 and R2.

Figure 4A:
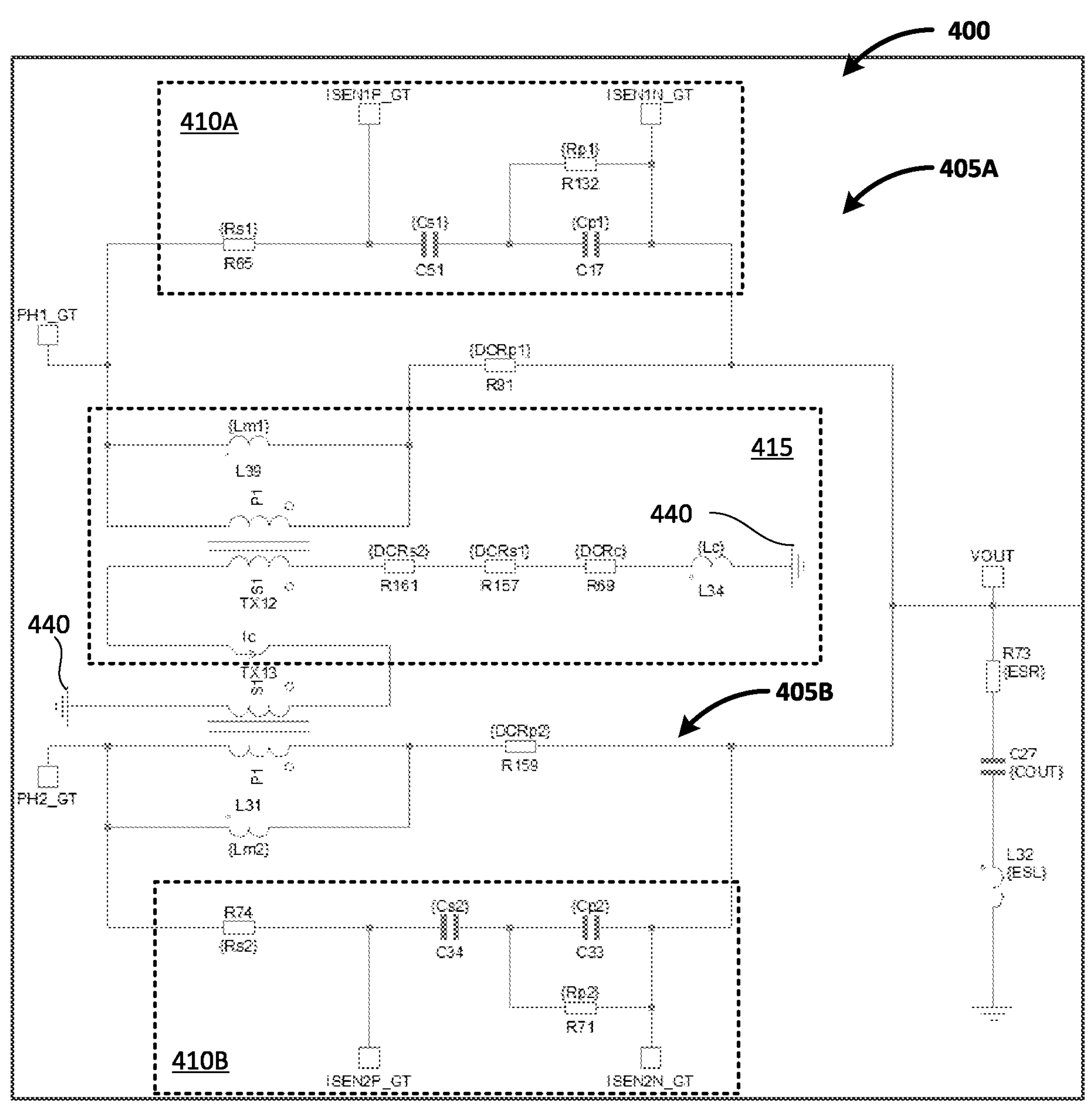
FIG. 4A, FIG. 4B, FIG. 4C, FIG. 4D, and FIG. 4E depict exemplary electrical schematics of applying two DCR circuits on a two-phase TLVR, and exemplary responses of the DCR circuits of the two phases.

FIG. 4A, FIG. 4B, FIG. 4C, FIG. 4D, and FIG. 4E depict an exemplary electrical schematic of applying two DCR circuits on a two-phase TLVR, and exemplary responses of the DCR circuits of the two phases. As shown in FIG. 4A, a two-phase TLVR 400 includes a first phase circuit 405A and a second phase circuit 405B. Each of the first phase circuit 405A and the second phase circuit 405B is controlled by a control signal PH1_GT and PH2_GT, respectively. For example, The PH1_GT and the PH2_GT may be connected to the PCC 115 and are configured to receive a corresponding PWM control signal.

In this example, the first phase circuit 405A includes a first DCR circuit 410A, and the second phase circuit 405B includes a second DCR circuit 410B. For example, the first DCR circuit 410A may generate sensing signals of an inductor current (e.g., the current through Lm1) at ISEN1P_GT and ISEN1N_GT. For example, the second DCR circuit 410B may generate sensing signals of an inductor current (e.g., the current through Lm2) at ISEN2P_GT and ISEN2N_GT.

In this example, the first DCR circuit 410A and the second DCR circuit 410B include a secondary side circuit 415. For example, the secondary side circuit 415 may include electric components of a TLVR circuit including Lm and Lc, and their direct current resistance. As shown, the secondary side circuit 415 includes a compensation inductor (Lc) to reference a ground terminal. For example, the compensation inductor may advantageously reduce high-frequency noise. For example, the compensation inductor may advantageously stabilize the current measurement of the first DCR circuit 410A and the second DCR circuit 410B. In some implementations, Lc=0.5*Lm.

In this example, a voltage reference terminal 440 is connected to a ground terminal. In other examples, the voltage reference terminal 440 may be connected to a Vout terminal.

Figures 4B, 4C:
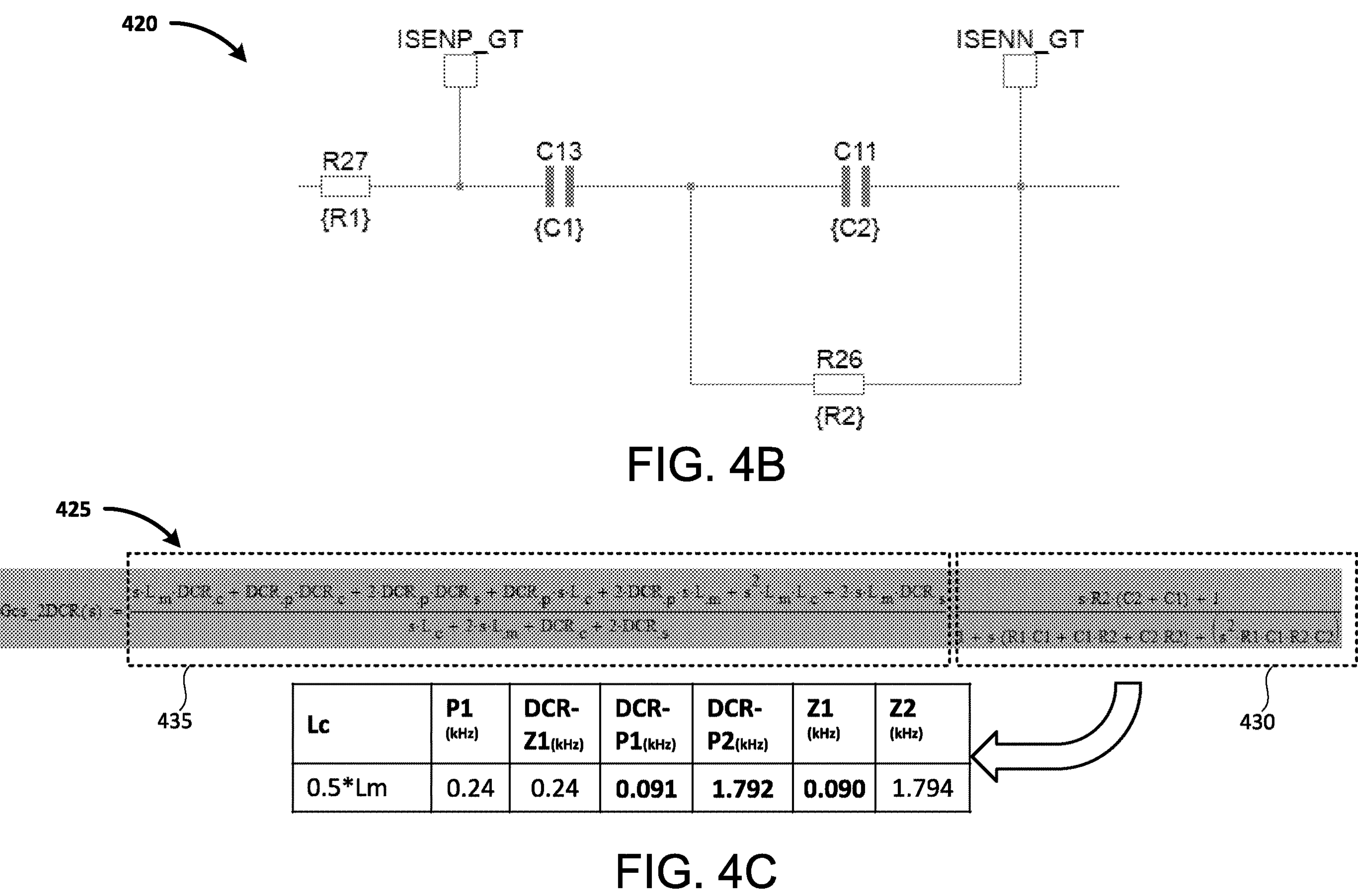

FIG. 4B shows an exemplary DCR circuit 420 applicable for each of the first phase circuit 405A and the second phase circuit 405B. For example, the DCR circuit 420 may include a second-order transfer function depending on the C1, C2, R1, R2, and the DCR resistance (e.g., DCRs1, DCRs1, DCRc, DCRp1, and DCRp2 in FIG. 4A).

As an illustrative example without limitation, an exemplary current sensing transfer function 425 of the DCR circuit 420 is shown in FIG. 4C. As shown, the exemplary current sensing transfer function 425 includes two parts, a primary side 430 and a secondary side 435. In various examples, the secondary side 435 may include 2 zeros and 1 pole, and the primary side 430 may include 2 poles and 1 zero. For example, by adjusting the R1, R2, C1, and C2, the primary side 430 may advantageously mitigate the 2 zeros and 1 pole generated by analog components (e.g., the Lm and the Lc) of the two-phase TLVR 400.

Figure 4D:
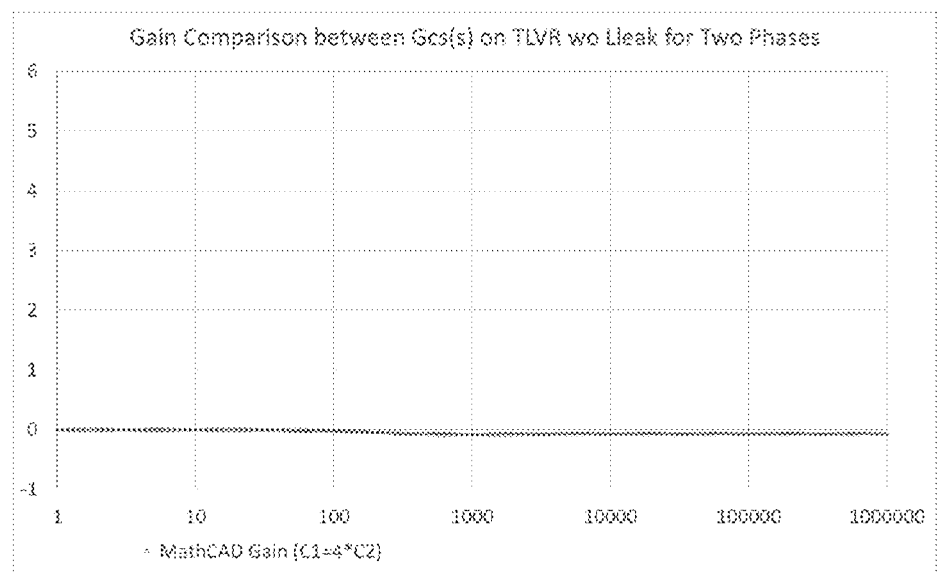
Figure 4E:
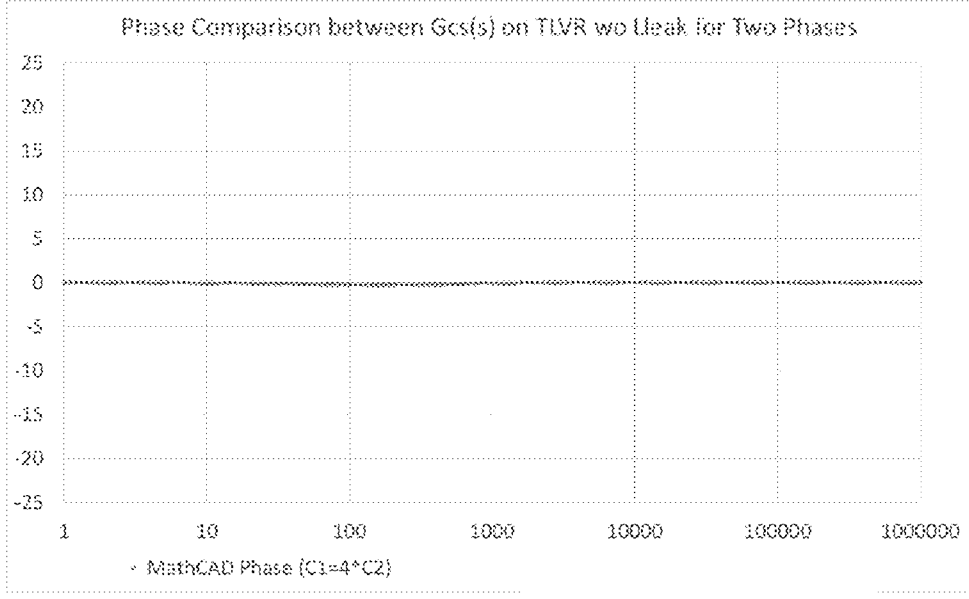

FIGS. 4D-E show exemplary gain and phase comparison between the first DCR circuit 410A and the second DCR circuit 410B across a wide frequency range (e.g., from 1 Hz to 1 MHz) based on exemplary operating conditions. As shown, the gain and phase difference between the first DCR circuit 410A and the second DCR circuit 410B are close to zero across the range of frequency. For example, the transfer functions of the first DCR circuit 410A and the second DCR circuit 410B may include a small gain and phase difference based on capacitance and resistance (e.g., R1, R2, C1, C2) selected to cancel the two zeros and one pole of the two-phase TLVR 400. Accordingly, for example, the exemplary current sensing transfer function 425 may advantageously be accurately measuring in-phase current of both the first phase circuit 405A and the second phase circuit 405B.

FIG. 5A, FIG. 5B, FIG. 5C, and FIG. 5D depict exemplary electrical schematics of applying a single DCR circuit on a two-phase TLVR, and exemplary responses. In this example, a two-phase TLVR 500 includes a single DCR circuit 505. The single DCR circuit 505 includes two terminals (ISEN1P_GT and ISEN1N_GT) connected to a first phase 510A and two terminals (ISEN2P_GT and ISEN2N_GT) connected to a second phase 510B. In this example, a voltage reference terminal 520 is connected to a Vout terminal. In other examples, the voltage reference terminal 520 may be connected to a ground terminal.

Figure 5A:
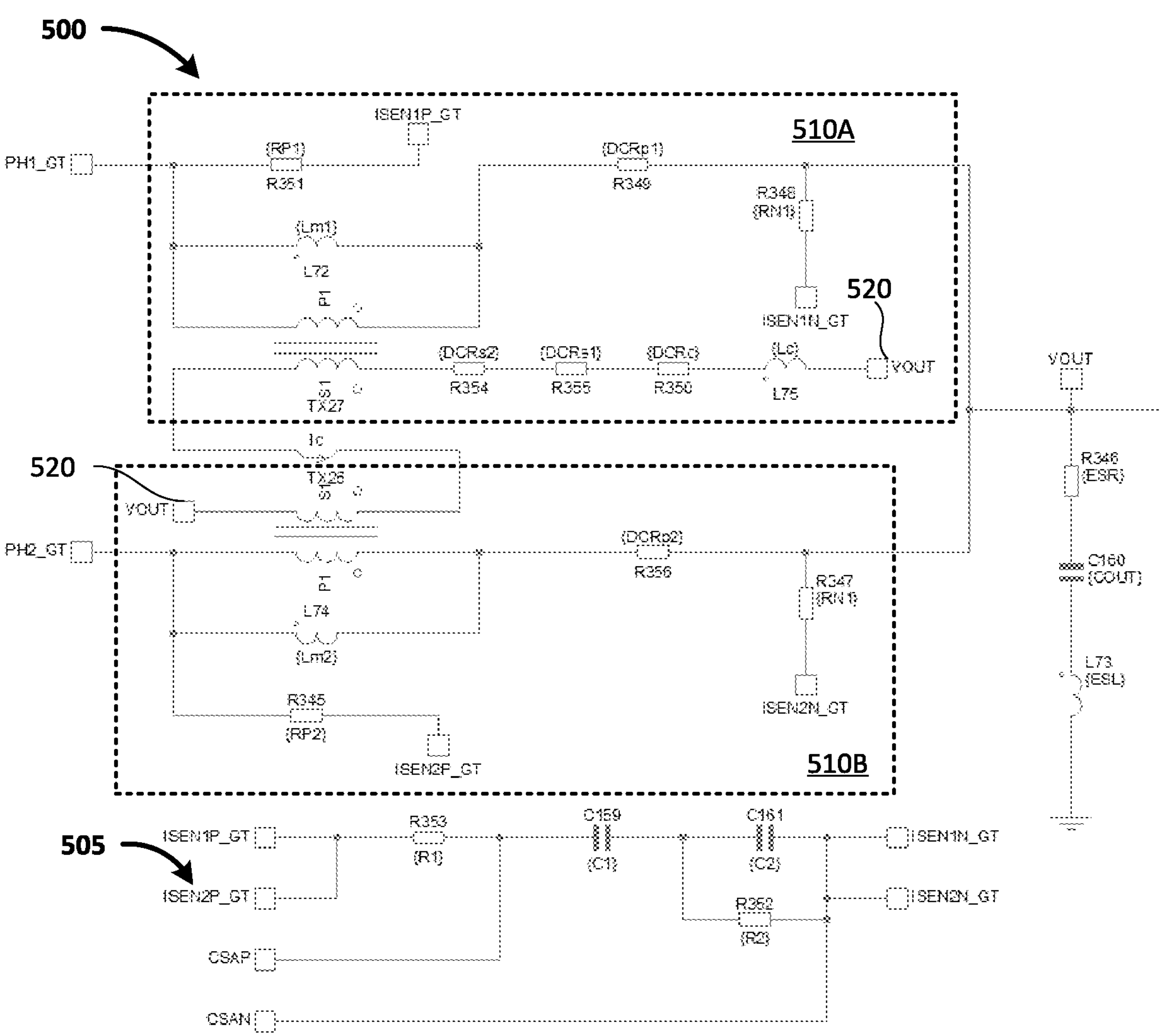
FIG. 5A, FIG. 5B, FIG. 5C, and FIG. 5D depict exemplary electrical schematics of applying a single DCR circuit on a two-phase TLVR, and exemplary responses.
Figure 5B:
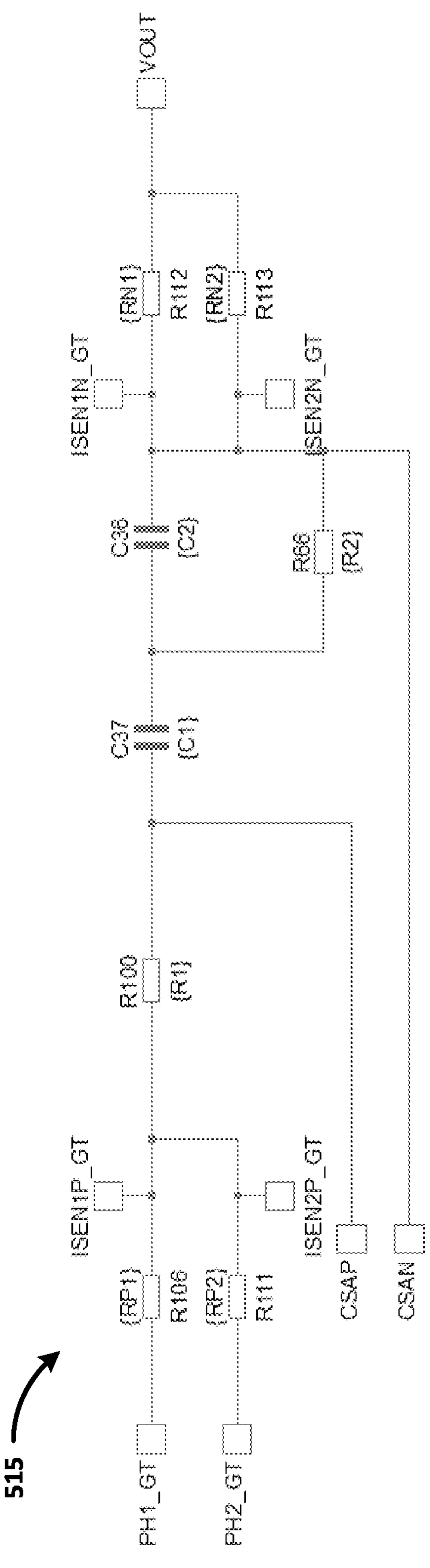
Figure 5C:
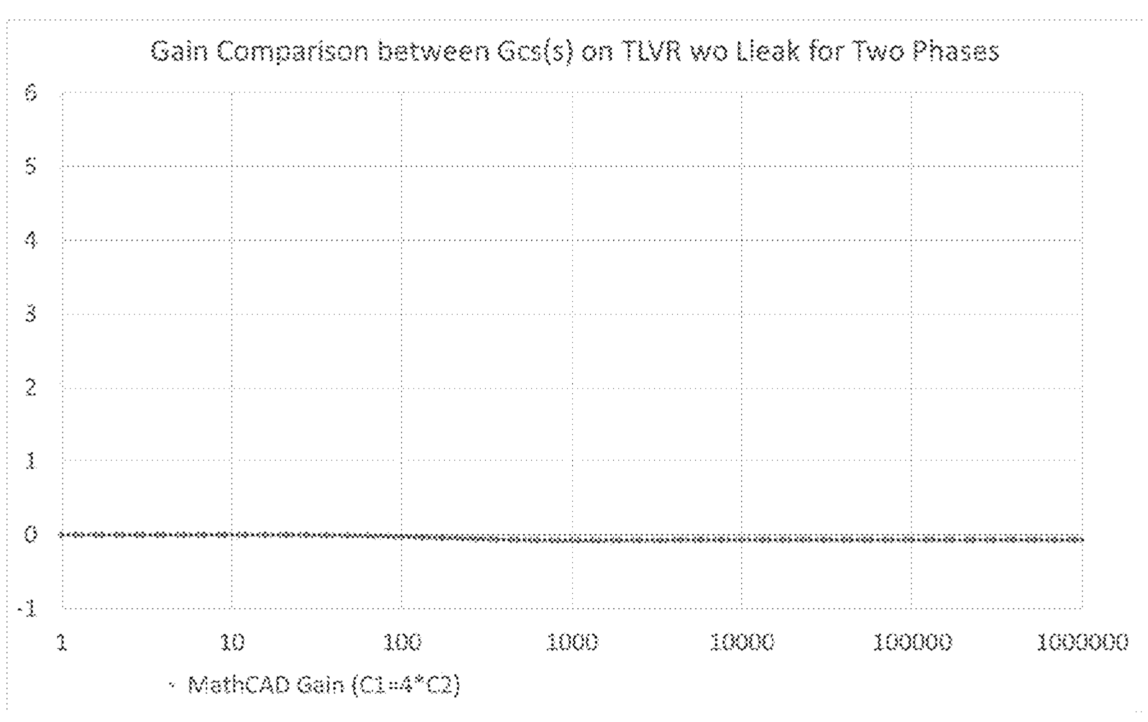
Figure 5D:
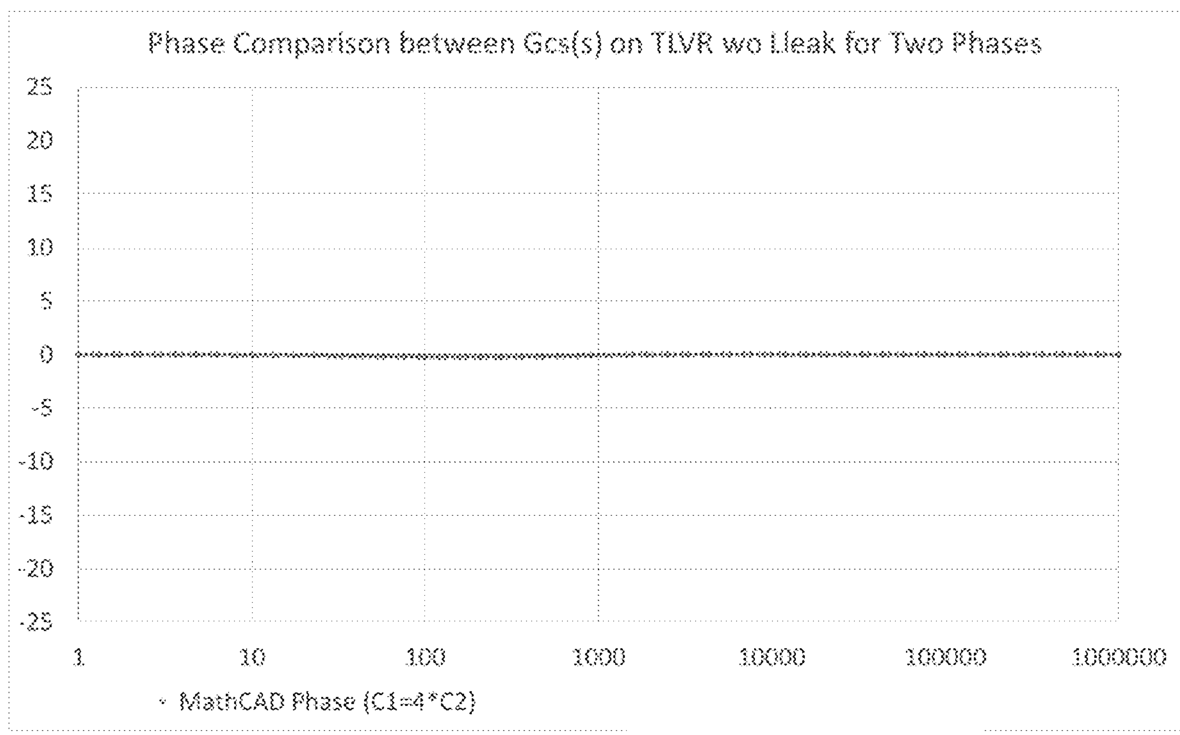

FIG. 5B shows an exemplary DCR circuit 515 derived from the two-phase TLVR 500. For example, the exemplary current sensing transfer function 425 may similarly be used to analyze a response of the DCR circuit 515. As shown in FIGS. 5C-D, gain and phase difference of the transfer function of the exemplary DCR circuit 515 between the two phases 510A, 510B are small based on capacitance and resistance (e.g., R1, R2, C1, C2) selected to cancel the two zeros and one pole of the two-phase TLVR 500.

Figure 6A:
FIG. 6A and FIG. 6B depict an exemplary fast transient response of the TLVR as shown in FIGS. 5A-E.
Figure 6A:
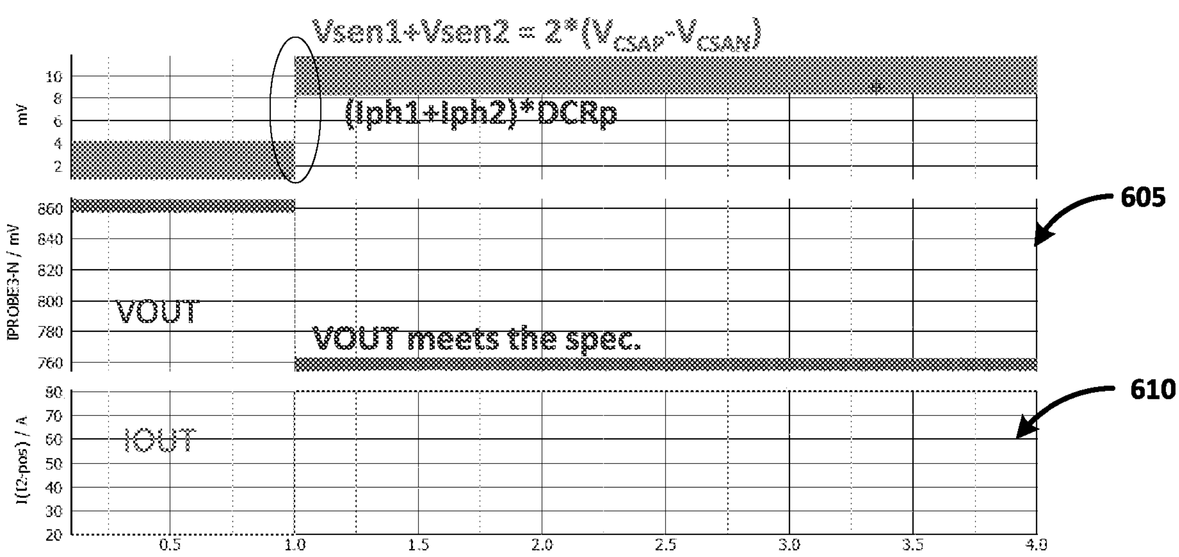
Figure 6B:
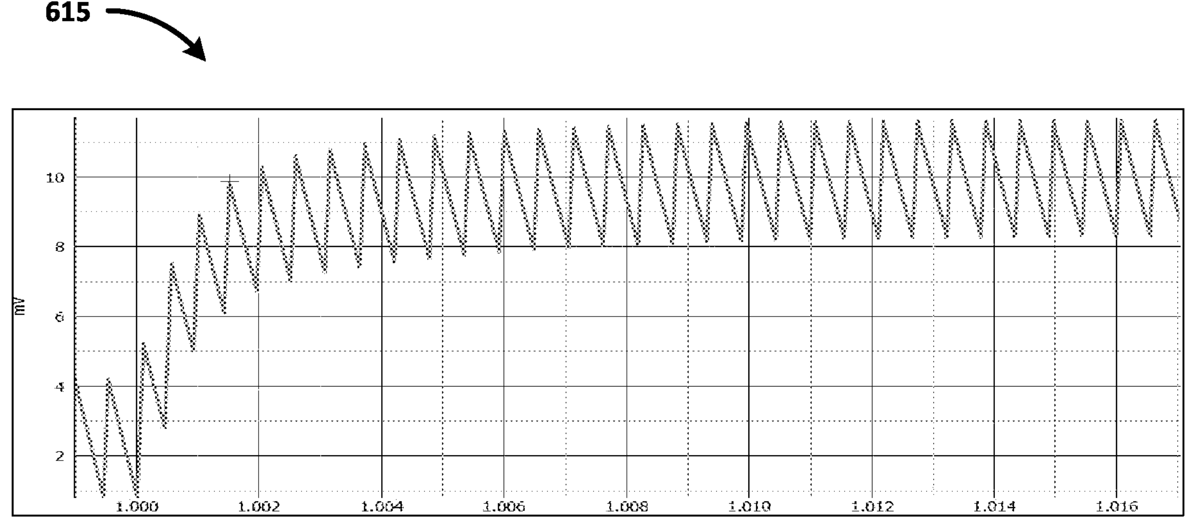

FIG. 6A and FIG. 6B depict an exemplary fast transient response of the TLVR as shown in FIGS. 5A-E. FIG. 6A includes a graph 600 that overlays a total sensed voltage (Vsense) from the first phase 510A and the second phase 510B, with a total inductor voltage calculated as (Iphase1+Iphase2)×DCR. The Vsense, as shown, closely follows the total inductor voltage across the time axis, demonstrating effective tracking of the actual voltage by the sensed voltage. FIG. 6A includes a graph 605 for output voltage and a graph 610 for output current. For example, each of the graphs 605, 610 shows that the two-phase TLVR 500 exhibits a fast transient response. For example, the two-phase TLVR 500 implementing with the single DCR circuit 505 may advantageously meet a precise specification (e.g., with maximum voltage drop of less than 120 mV when current increases from 20 A to 80 A).

FIG. 6B shows an exemplary transient response 615 within the graph 600 from the circuit of FIG. 4B or the circuit of FIG. 5B in a simulation performed in MathCAD and/or SIMPLUS. As an illustrative example, the exemplary transient response 615 shows that the Vsense very accurately tracks the inductor voltage. In some examples, an error margin between the two may be less than −0.06 dB.

Figure 7A:
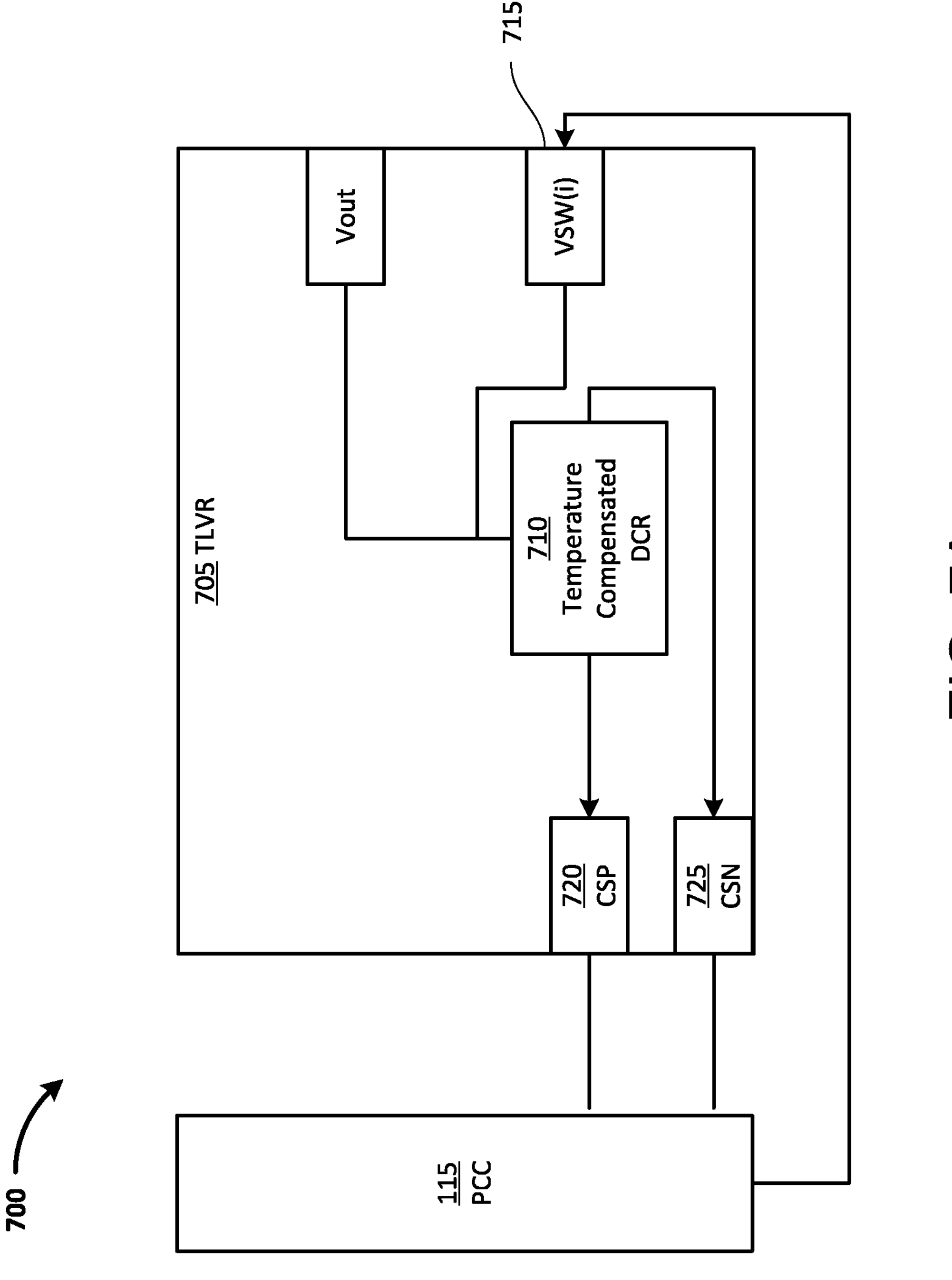
FIG. 7A, FIG. 7B, FIG. 7C, FIG. 7D, FIG. 7E and FIG. 7F depict exemplary temperature compensated PSU and electrical schematics of various embodiments of the temperature compensated PSU including a shared DCR circuit.

FIG. 7A, FIG. 7B, FIG. 7C, FIG. 7D, FIG. 7E and FIG. 7F depict exemplary temperature compensated PSU and electrical schematics of various embodiments of the temperature compensated PSU including a shared DCR circuit. As shown in FIG. 7A, a PSU 700 includes a TLVR 705 connected to the PCC 115. The TL VR 705 includes a temperature compensated DCR 710. The DCR 710 may be operably connected to a Vout of the TLVR 705 and a switch input 715 of the TLVR 705. As shown, the switch input 715 receives input from the PCC 115.

The DCR 710 generates a current sensing positive (CSP) signal at a CSP pin 720 and a current sensing negative (CSN) signal at a CSN pin 725. For example, the PCC 115 may generate PWM control signals to each power phase of the TLVR 705 based on the CSP and the CSN signals.

In some embodiments, operating characteristics of the TLVR 705 may vary based on temperature during operation. In some examples, the DCR 710 may advantageously adjust resistance (e.g., of R1 and R2) to dynamically match an operating characteristics of the TLVR 705. In some examples, the DCR 710 may advantageously track the inductor current of the TLVR 705 independent of temperature change. In some embodiments, the DCR 710 may include an NTC resistor configured to adjust automatically as a function of operating temperature.

Figure 7B:
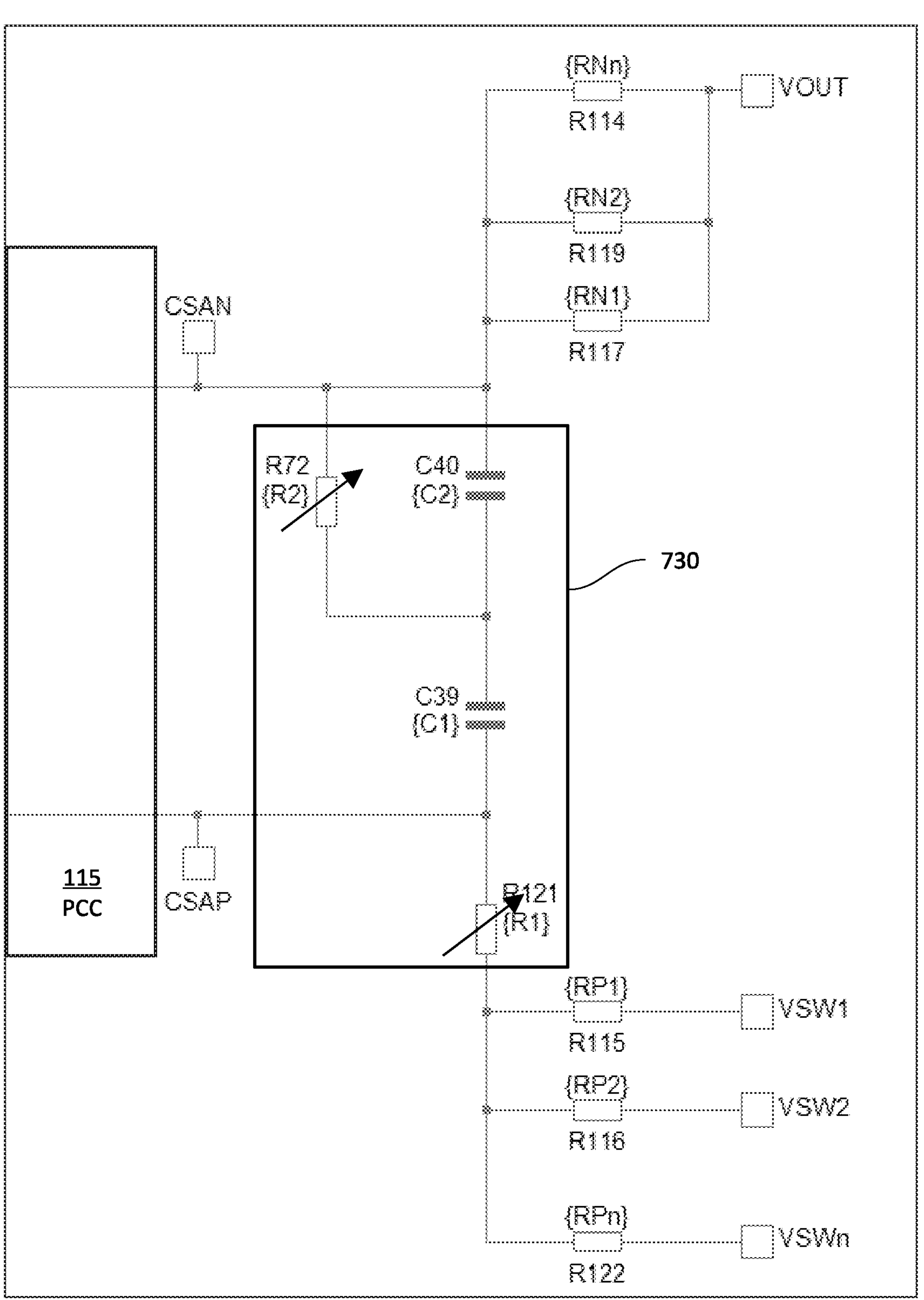

As shown in FIG. 7B, a temperature compensated DCR circuit 730 includes two NTC resistors R1 and R2. In some embodiments, the temperature compensated DCR circuit 730 may be flexibly applicable to any PSU with or without temperature compensated components.

Figure 7C:
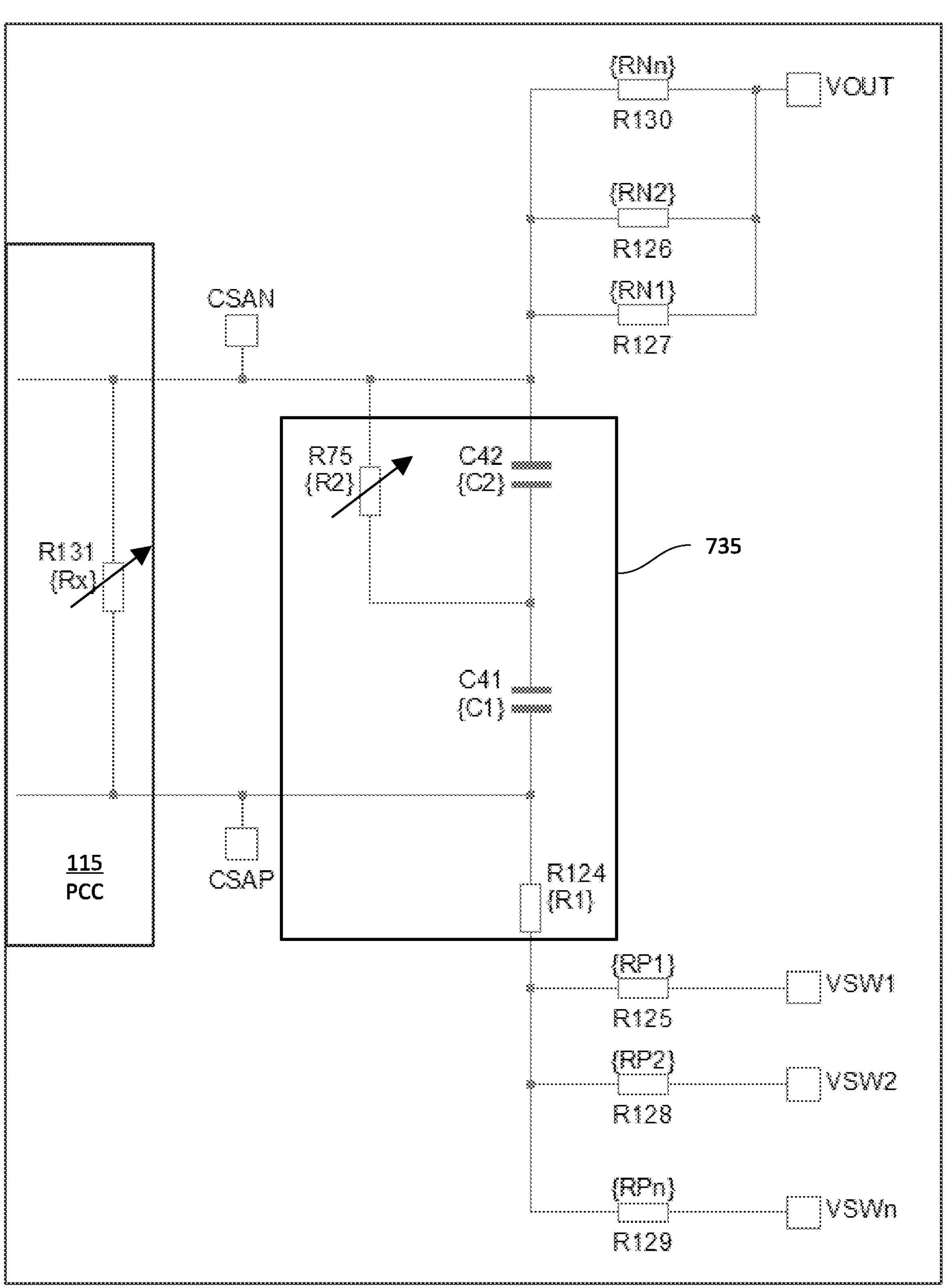

As shown in FIG. 7C, a temperature compensated DCR circuit 735 includes one NTC resistor R2. In some embodiments, the temperature compensated DCR circuit 735 may save one NTC resistor by considering a thermistor (Rx) of the PCC 115.

Figure 7D:
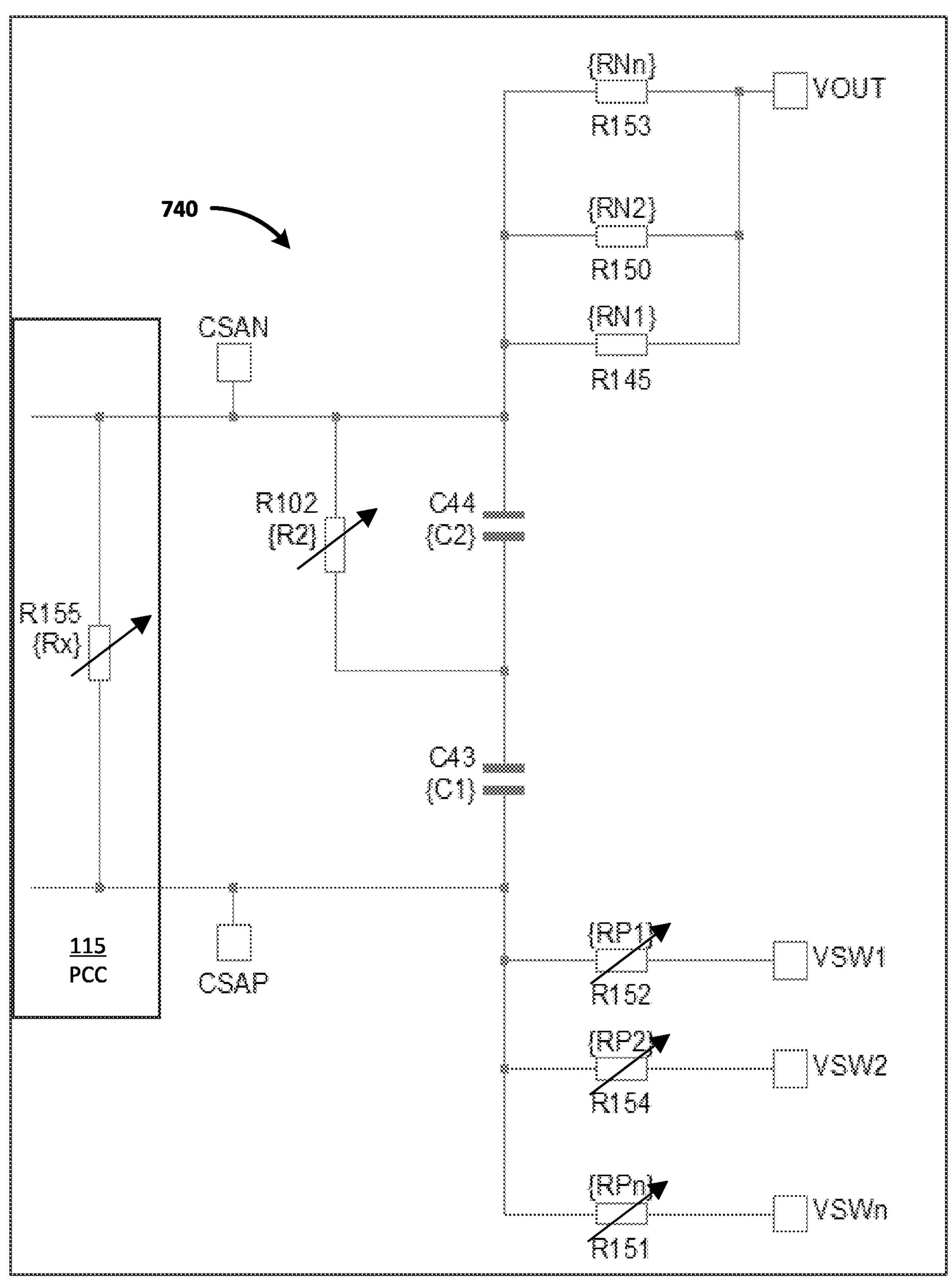
Figure 7E:
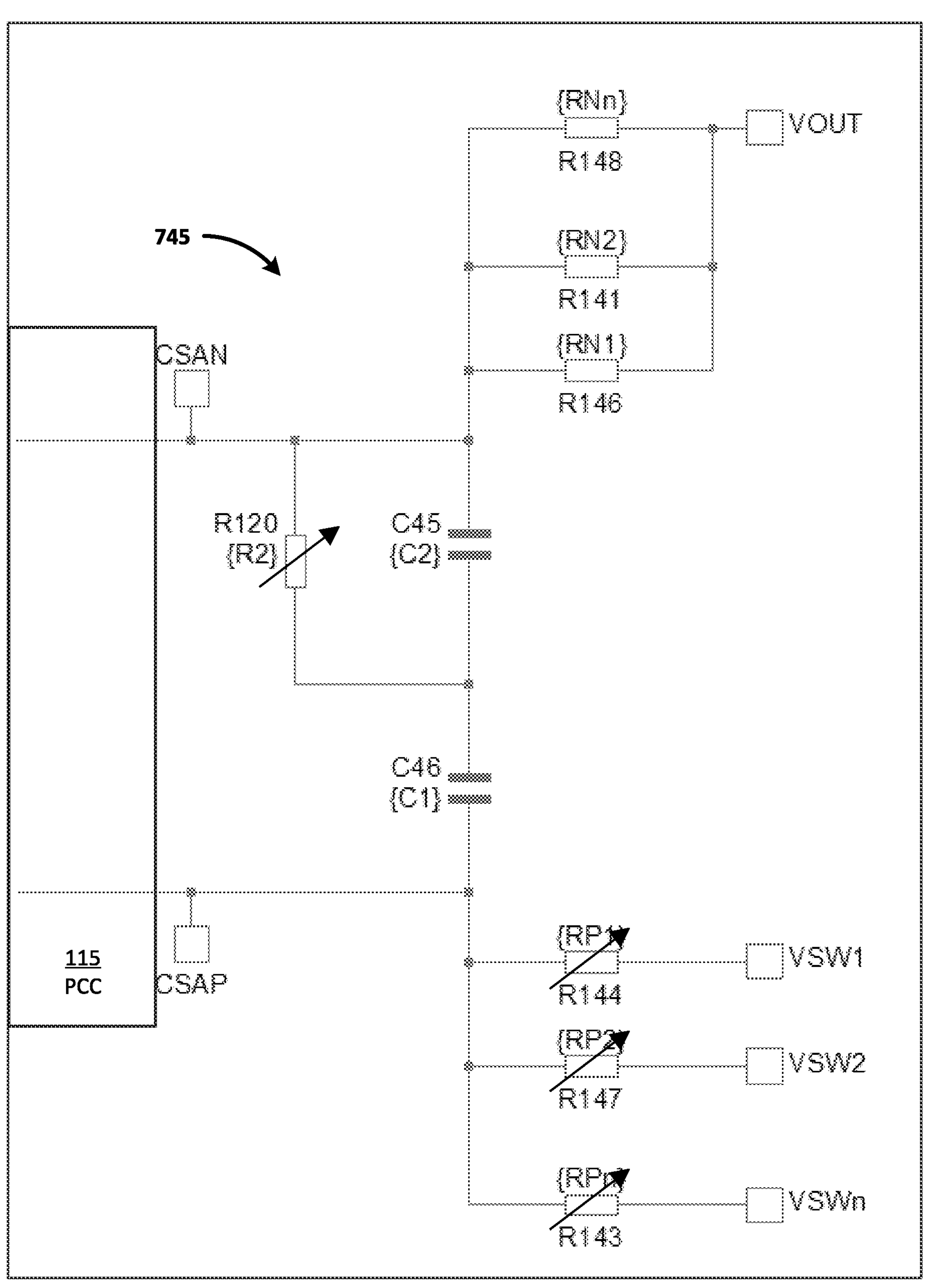
Figure 7F:
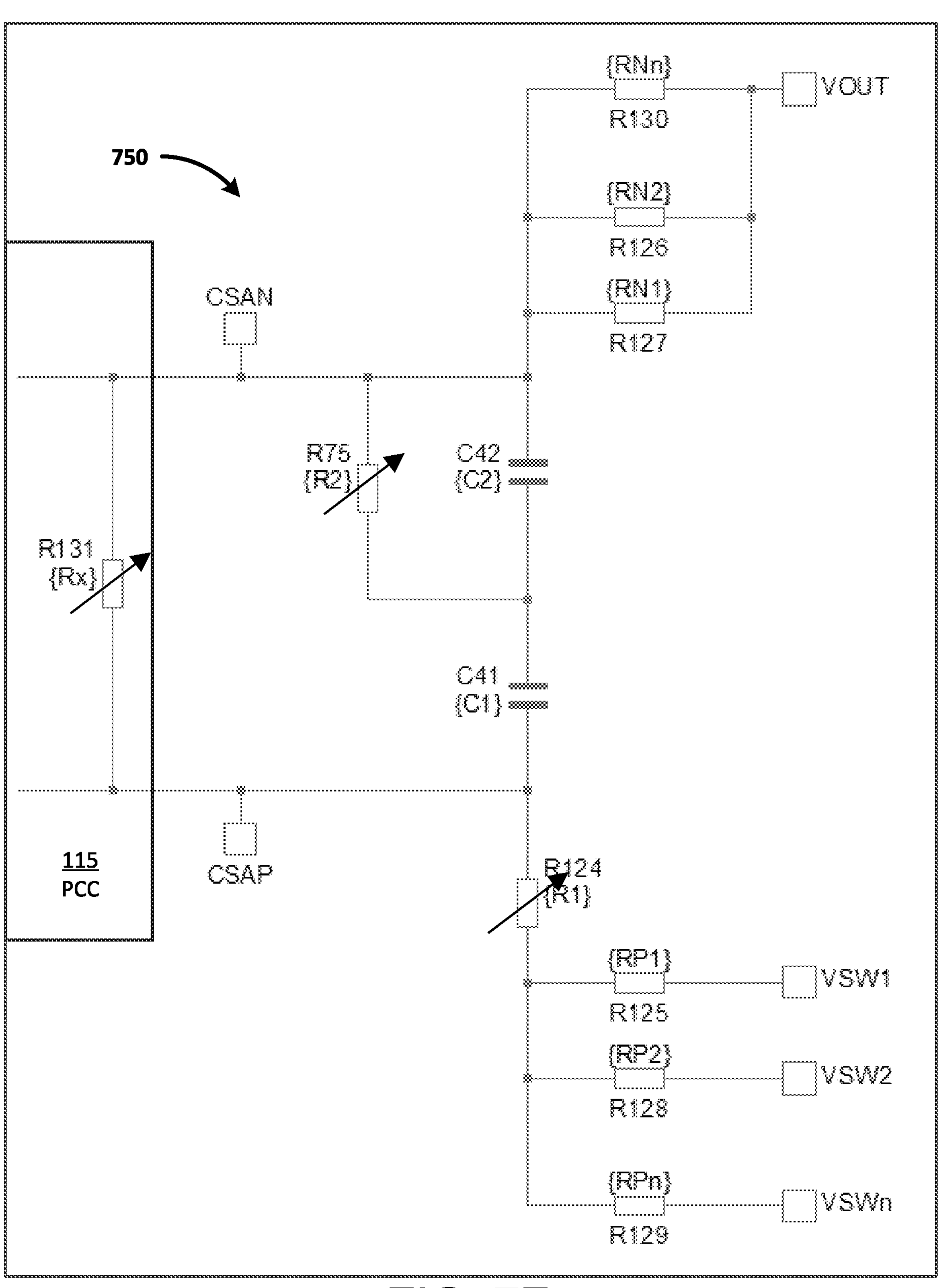

As shown in FIG. 7D, a temperature compensated DCR circuit 740 includes thermal compensated R2, Rx, RPx (and/or RNx). In some embodiments, the temperature compensated DCR circuit 740 may select R2 based on a temperature response of Rx and RPx. As shown in FIG. 7D, a temperature compensated DCR circuit 745 includes thermal compensated R2 and RPx (and/or RNx). As shown in FIG. 7F, a temperature compensated DCR circuit 750 includes thermal compensated R2 and Rx. In some implementations, for each phase, Rx may be implemented by an integrated circuit and/or external component. For example, C1 and C2 of the temperature compensated DCR circuit 735 may include a value to compensate for the pole-zero set of a TLVR of the PSU 800. In some examples, Rx, R1, and R2 may be configured to compensate for a wide operating temperature of the TLVR.

Figure 8A:
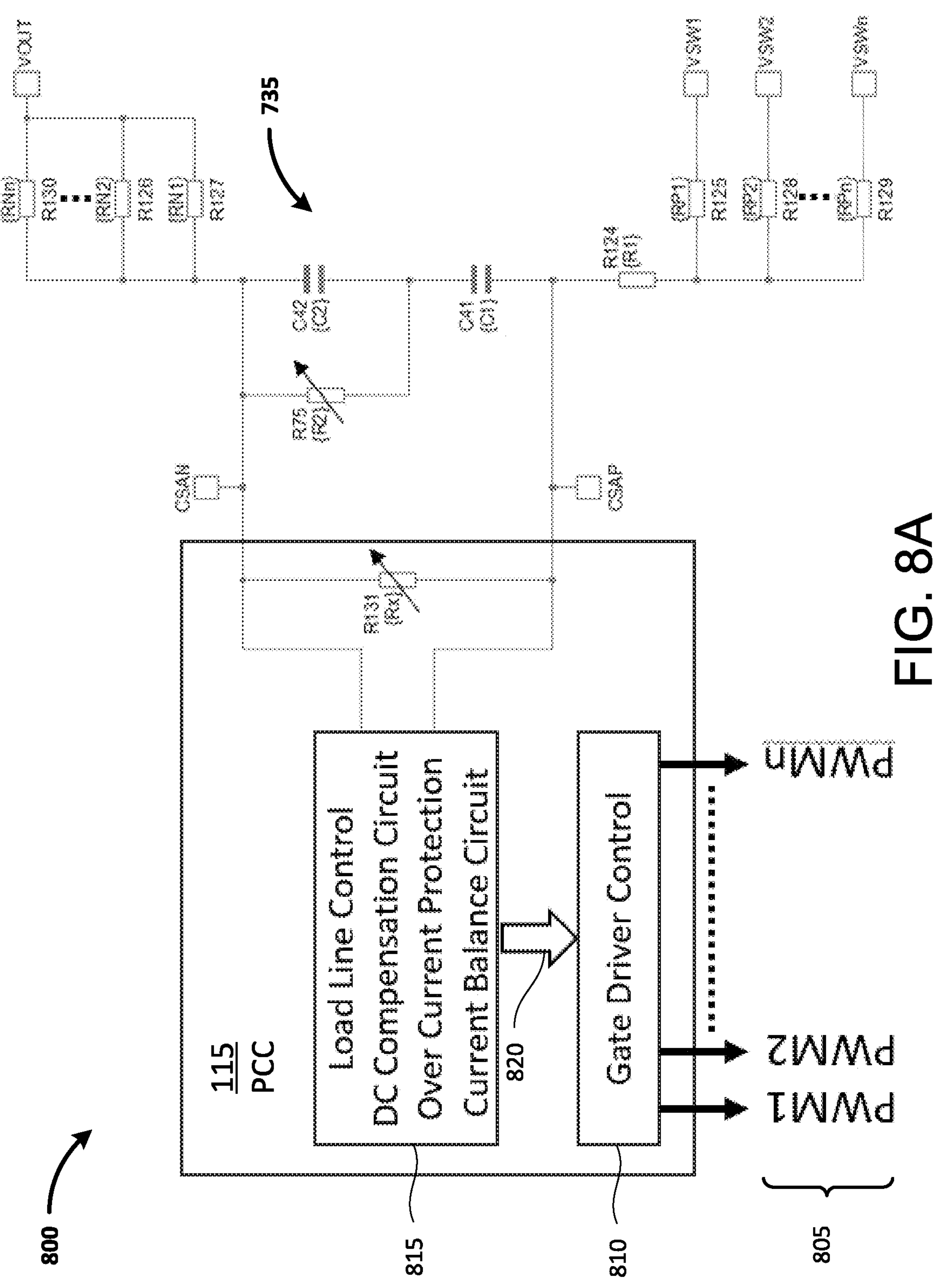
FIG. 8A and FIG. 8B depict exemplary power controller chips of a temperature compensated PSU including a shared DCR circuit.
Figure 8B:
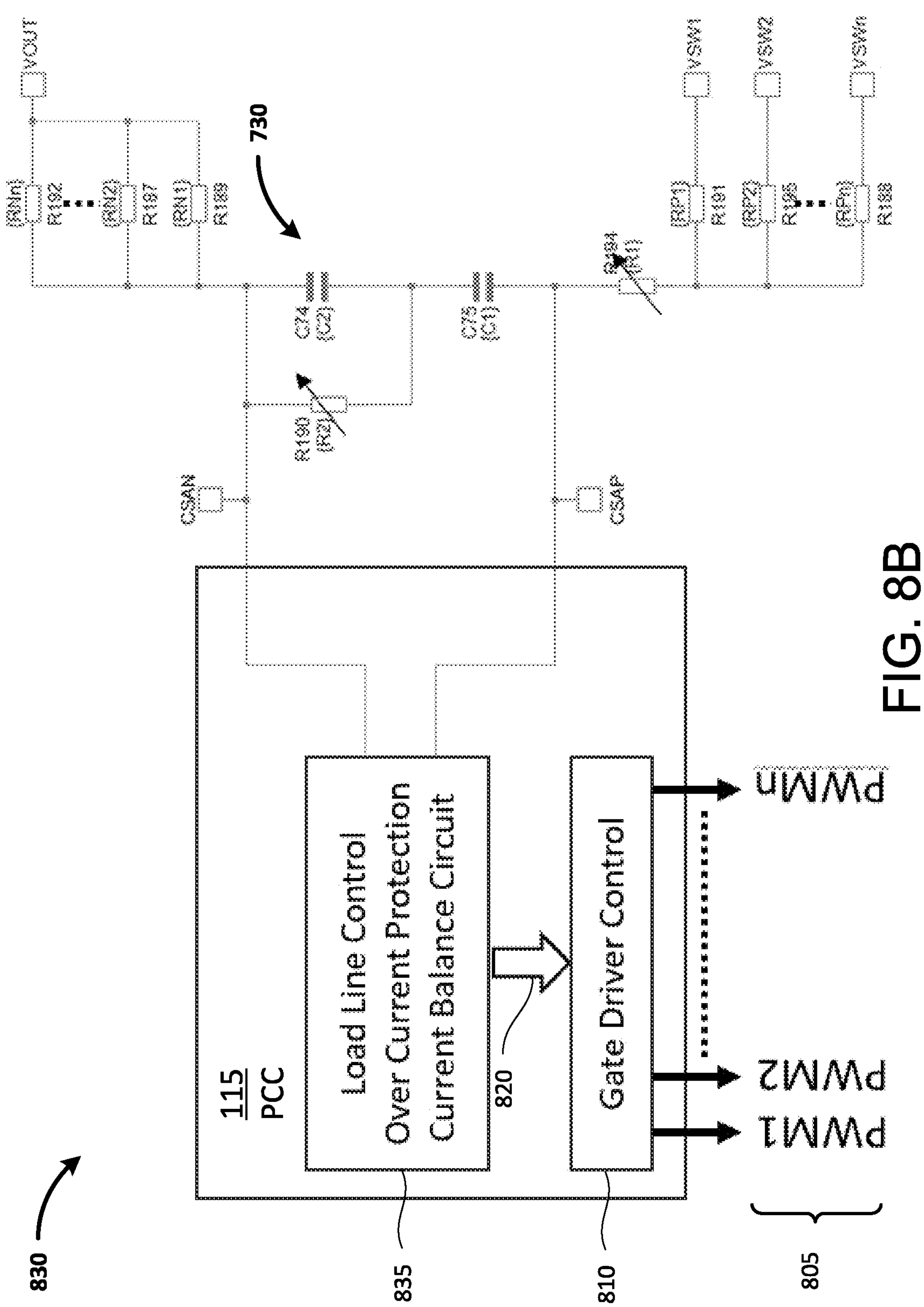

FIG. 8A and FIG. 8B depict exemplary power controller chips of a temperature compensated PSU including a shared DCR circuit. As shown in FIG. 8A, a PSU 800 includes the PCC 115 and the temperature compensated DCR circuit 735 as described with reference to FIG. 7C. For example, the PSU 800 may be temperature compensated by the NTC resistors Rx and R2.

In this example, the PCC 115 includes a gate driver control 810 and a circuit control engine 815. For example, the gate driver control 810 may generate gate control signals 805 (e.g., PWM1, . . . , PWMn signals) to a TLVR (e.g., the TLVR 120). The circuit control engine 815, for example, is coupled to the temperature compensated DCR circuit 735 at two pins, current sense aggregated negative (CSAN) and current sense aggregate positive (CSAP). In some implementations, the circuit control engine 815 may include a load line control engine, a DC compensation circuit, an overcurrent protection engine, and a current balance circuit. For example, the circuit control engine 815 may generate a feedback signal 820 to the gate driver control 810 based on the overcurrent protection engine, the direct current (DC) compensation circuit, the overcurrent protection engine, and the current balancing circuit. In some embodiments, the gate driver control 810 may generate the gate control signals 805 based on the feedback signal 820.

In some implementations, the circuit control engine 815 may determine an aggregated inductor current of the N phases in the PSU 800 based on the signal at CSAN and CSAP. For example, the load line control engine may adjust the gate control signals 805 dynamically as a function of the aggregated inductor current. For example, the load line control engine may be configured to supply stable power output to a load (e.g., the AIPS 110) ensuring optimal power delivery and stability under varying load conditions.

For example, the DC compensation circuit may be configured to correct DC offset errors in the PSU 800 as a function of the aggregated inductor current. For example, the DC compensation circuit may advantageously enhance accuracy and reliability of the TLVR 120. For example, the over-current protection engine may monitor a current flow in the TLVR 120 based on the aggregated inductor current. For example, the overcurrent protection may activate protective mechanisms if the aggregated inductor current is determined to exceed a predetermined (e.g., predefined, dynamically determined based on predefined models) threshold. For example, the overcurrent protection circuit may advantageously enhance safety and longevity of the PSU 800.

For example, the current balance circuit may be configured to distribute a load across the multiple phases in the PSU 800. For example, current balancing may advantageously reduce a risk of overheating and stress on any single phase. For example, the current balancing circuit may advantageously improve durability of the PSU 800.

In some implementations, for each phase, Rx may be implemented by an integrated circuit and/or external component. For example, C1 and C2 of the temperature compensated DCR circuit 735 may include a value to compensate for a pole-zero set of a TLVR of the PSU 800. In some examples, Rx and R2 may be configured to compensate for a wide operating temperature of the TLVR.

As shown in FIG. 8B, a PSU 830 includes the temperature compensated DCR circuit 730 as described with reference to FIG. 7B. In this example, the temperature compensated DCR circuit 730 may control the temperature compensation of the temperature compensated DCR circuit 730. In some implementations, a circuit control engine 835 may include the overcurrent protection engine, the overcurrent protection engine, and the current balancing circuit as described with reference to FIG. 8A. For example, C1 and C2 of the temperature compensated DCR circuit 735 may include a value to compensate for the pole-zero set of a TLVR of the PSU 800. In some examples, Rx and R2 may be configured to compensate for a wide operating temperature of the TLVR.

Figure 9A:
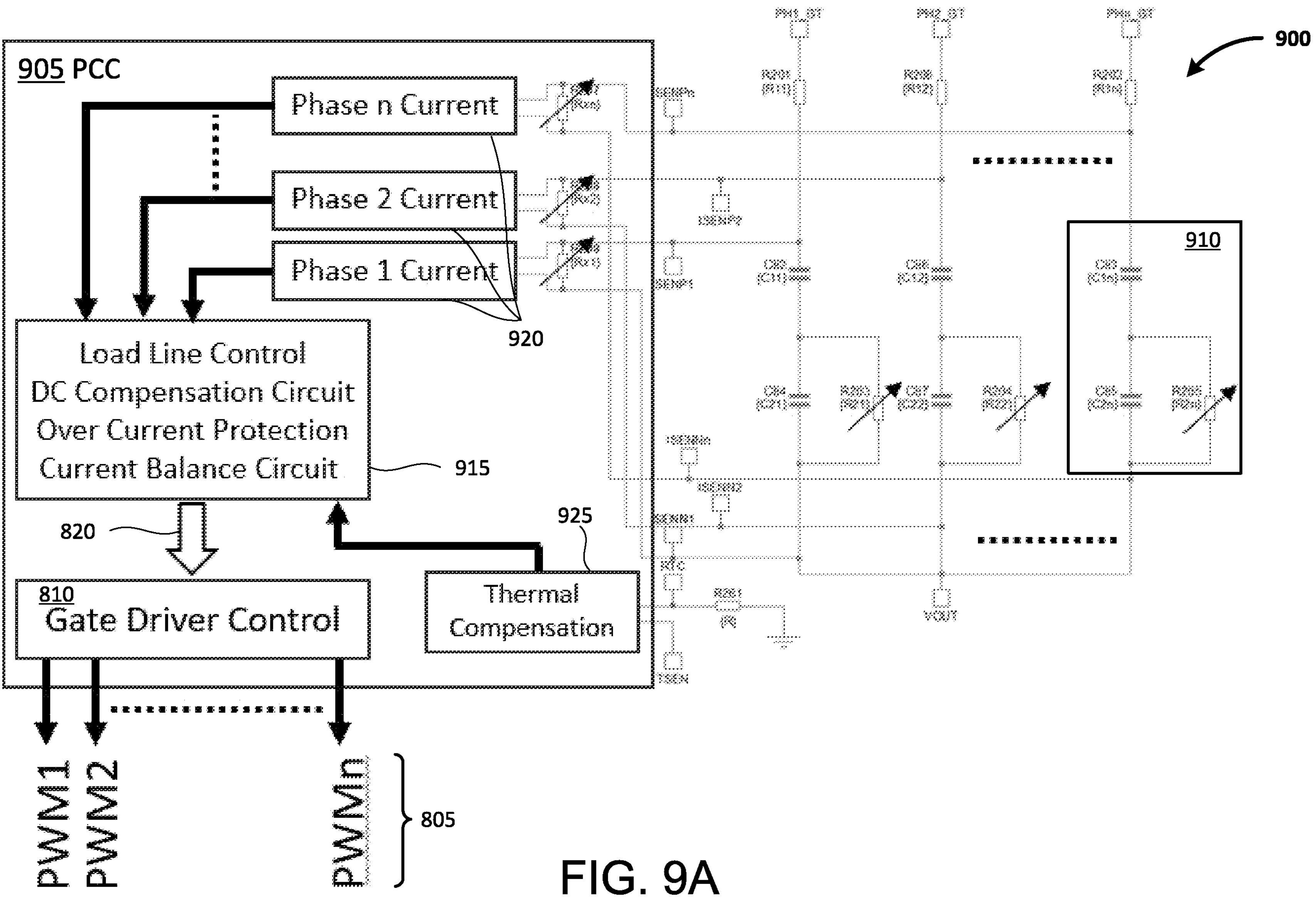
FIG. 9A, FIG. 9B, and FIG. 9C depict exemplary power controller chips of a temperature compensated PSU including a DCR circuit per each phase of a connected TLVR.
Figure 9B:
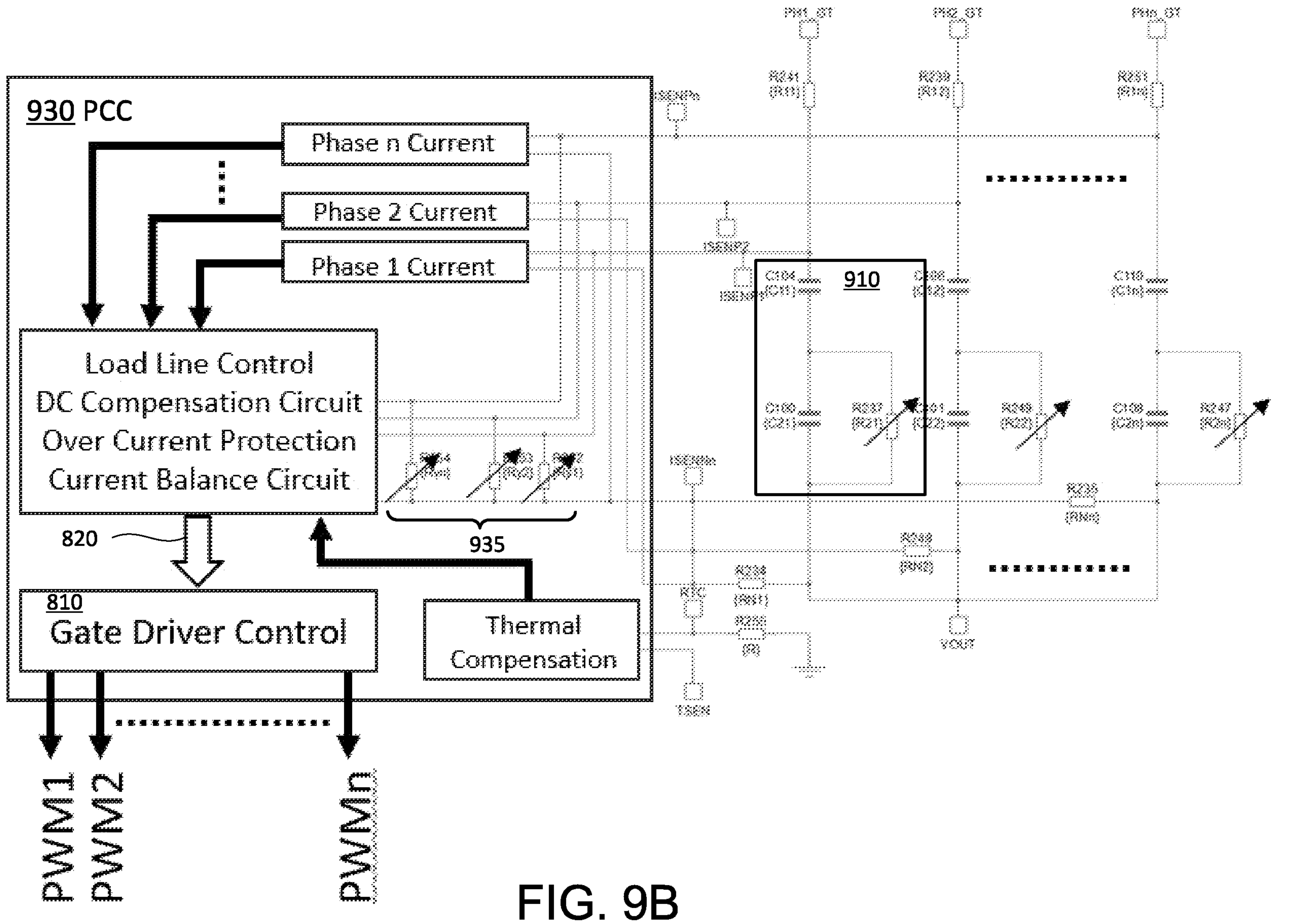
Figure 9C:
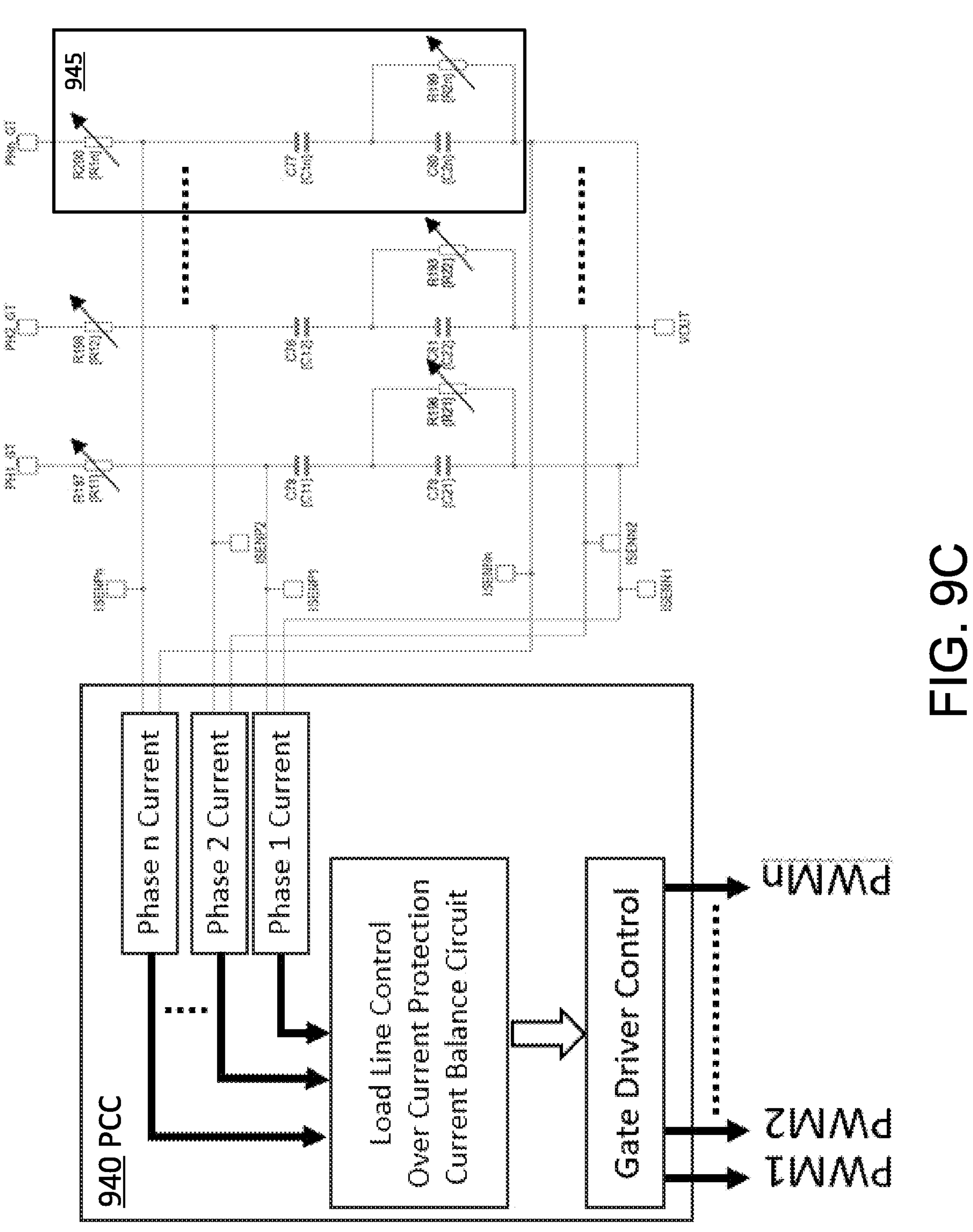

FIG. 9A, FIG. 9B, and FIG. 9C depict exemplary power controller chips of a temperature compensated PSU including a DCR circuit per each phase of a connected TLVR. As shown in FIG. 9A, a PSU 900 includes a PCC 905. The PCC 905 generates the gate control signals 805 in N phases. As shown, the PCC 905 is coupled to N DCR circuits 910, each of the N DCR circuits 910 may be configured to a corresponding phase of a TLVR.

As shown, the PCC 905 includes two pins per phase to receive a positive sensing signal and a negative sensing signal from each of the N phases. For example, the PCC 905 may be connected to the N DCR circuits 910 using N*2 pins. For example, the N DCR circuits 910 may each include a temperature compensated resistor (R21, R22, . . . , R2n).

The PCC 905 includes a circuit control engine 915. For example, the circuit control engine 915 may include a circuit control engine 835 may include the overcurrent protection engine, the DC compensation engine, the overcurrent protection engine, and the current balancing circuit as described with reference to FIG. 8A. In this example, the circuit control engine 915 may generate the feedback signal 820 based on an in-phase current 920 of each of the N phases. Each of the in-phase current 920 may be adjusted by an independent on-chip NTC resistor (Rx1, . . . , Rxn), with a total of N independent on-chip NTC resistor, for example. For example, the independent on-chip NTC resistors may be configured as pulling up resistors. The PCC 905 includes a temperature compensation module 925. For example, the circuit control engine 915 may receive signals from the temperature compensation module 925 to generate the feedback signal 820 to the gate driver control 810.

As shown in FIG. 9B, a PCC 930 is connected to the N DCR circuits 910 using N+1 pins. For example, the PCC 930 is connected to the N DCR circuits 910 at each positive signal of the N phase (ISENDCR-P1, ISENDCR-P2, . . . , ISENPN). As shown, each negative signal of the N phases is connected together and received at the PCC 930 at a single pin (ISENNn). As shown, the PCC 930 includes pulling down temperature compensated resistors 935 (Ry1, . . . Ryn), each connected to a positive terminal of a corresponding phase. In some embodiments, the ISENNn may be labeled as a reference pin.

As shown in FIG. 9C, a PCC 940 is connected to N DCR circuits 945. As shown, each of the DCR circuit 945 may include two temperature compensated (e.g., NTC) resistors. For example, the PCC 940 may advantageously not be required to have an internal temperature compensated resistor on chip. In this example, the PCC 940 includes N*2 pins to connect to the N DCR circuits 945.

Figure 10:
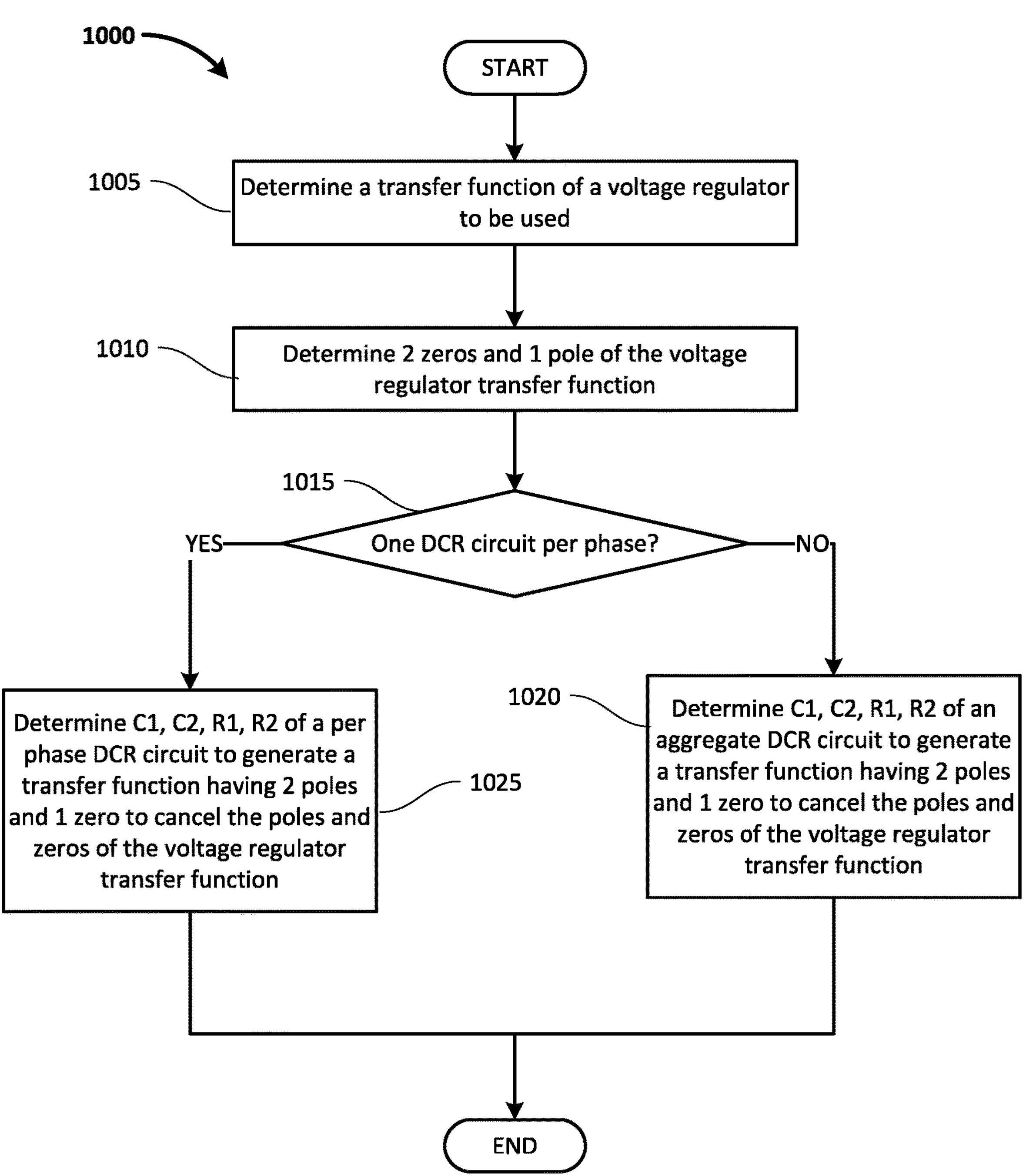
FIG. 10 is a flowchart illustrating an exemplary DCR sensing circuit configuration method.

FIG. 10 is a flowchart illustrating an exemplary DCR sensing circuit configuration method 1000. For example, the method 1000 may be performed by an electrical engineer in designing the MOCSC 125 for the PSU 105. In this example, the method 1000 begins when a transfer function of a voltage regulator used is determined in step 1005. For example, the engineer may determine the secondary side 435 of the exemplary current sensing transfer function 425. Next, in step 1010, two zeros and one pole of the voltage regulator transfer function is determined. For example, the electrical engineer may determine DCR-P1, DCR-P2, and DCR-Z1 in the secondary side 435 as shown in FIG. 4C.

In a decision point 1015, it is determined whether one DCR circuit is used per phase. For example, the electrical engineer may decide whether a total inductor current is enough for the HiPoFRS 100. Or, in some implementations, in-phase current of each phase may be needed. If per phase DCR is not needed, in step 1020, C1, C2, R1, R2 of an aggregate DCR circuit is determined to generate a transfer function having 2 poles and 1 zero to cancel the poles and zeros of the voltage regulator transfer function, and the method 1000 ends. For example, a topology of the single DCR circuit 505 may be used.

If per phase DCR is needed, in step 1025, C1, C2, R1, R2 of a per phase DCR circuit is determined to generate a transfer function having 2 poles and 1 zero to cancel the poles and zeros of the voltage regulator transfer function, and the method 1000 ends. For example, a topology of the DCR circuits 405A, 405B may be used.

Although various embodiments have been described with reference to the figures, other embodiments are possible.

Although an exemplary system has been described with reference to FIG. 1, other implementations may be deployed in other industrial, scientific, medical, commercial, and/or residential applications.

In various embodiments, some bypass circuits implementations may be controlled in response to signals from analog or digital components, which may be discrete, integrated, or a combination of each. Some embodiments may include programmed, programmable devices, or some combination thereof (e.g., PLAs, PLDs, ASICs, microcontroller, microprocessor), and may include one or more data stores (e.g., cell, register, block, page) that provide single or multi-level digital data storage capability, and which may be volatile, non-volatile, or some combination thereof. Some control functions may be implemented in hardware, software, firmware, or a combination of any of them.

Computer program products may contain a set of instructions that, when executed by a processor device, cause the processor to perform prescribed functions. These functions may be performed in conjunction with controlled devices in operable communication with the processor. Computer program products, which may include software, may be stored in a data store tangibly embedded on a storage medium, such as an electronic, magnetic, or rotating storage device, and may be fixed or removable (e.g., hard disk, floppy disk, thumb drive, CD, DVD).

Some systems may be implemented as a computer system that can be used with various implementations. For example, various implementations may include digital circuitry, analog circuitry, computer hardware, firmware, software, or combinations thereof. Apparatus can be implemented in a computer program product tangibly embodied in an information carrier, e.g., in a machine-readable storage device, for execution by a programmable processor; and methods can be performed by a programmable processor executing a program of instructions to perform functions of various embodiments by operating on input data and generating an output. Various embodiments can be implemented advantageously in one or more computer programs that are executable on a programmable system including at least one programmable processor coupled to receive data and instructions from, and to transmit data and instructions to, a data storage system, at least one input device, and/or at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, which may include a single processor or one of multiple processors of any kind of computer. Generally, a processor will receive instructions and data from a read-only memory or a random-access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including, by way of example, semiconductor memory devices, such as EPROM, EEPROM, and flash memory devices; magnetic disks, such as internal hard disks and removable disks; magneto-optical disks; and CD-ROM and DVD-ROM disks. The processor and the memory can be supplemented by, or incorporated in, ASICs (application-specific integrated circuits).

Various examples of modules may be implemented using circuitry, including various electronic hardware. By way of example and not limitation, the hardware may include transistors, resistors, capacitors, switches, integrated circuits, other modules, or some combination thereof. In various examples, the modules may include analog logic, digital logic, discrete components, traces and/or memory circuits fabricated on a silicon substrate including various integrated circuits (e.g., FPGAs, ASICs), or some combination thereof. In some embodiments, the module(s) may involve execution of preprogrammed instructions, software executed by a processor, or some combination thereof. For example, various modules may involve both hardware and software.

In an illustrative aspect, a power switching regulating system may include a trans-inductor voltage regulator (TLVR). For example, the TLVR may include at least two phases. For example, each of the at least two phases may include a current inducing circuit.

For example, the power switching regulating system may include a second-order current sensing circuit operably coupled to the TLVR and configured to measure a current flow of each of the at least two phases at the current inducing circuit. power switching regulating system may include a controller chip operably coupled to the second-order current sensing circuit and may be configured to receive a current measurement from the second-order current sensing circuit. For example, the controller chip may be configured to generate a phase control signal for each of the at least two phases based on the current measurement.

For example, the TLVR may include a first transfer function including two zeros and one pole. For example, the second-order current sensing circuit may include a second transfer function may include two DCR-poles and one DCR-zero. For example, a first magnitude difference between the two DCR-poles and the two zeros, and a second magnitude difference between the one DCR-zero and the one pole may be within a predetermined threshold. For example, the predetermined threshold may be less than 2%.

For example, the second-order current sensing circuit may include a direct current resistance (DCR) current sensing circuit may include at least two capacitors. For example, the current inducing circuit may include a transformer may include a primary side of the transformer may be coupled to a VOUT terminal of the current inducing circuit. For example, the current inducing circuit may include a secondary side of the transformer may be coupled to a compensation inductor operably coupled to a reference terminal.

For example, the power switching regulating system may include at least two negative temperature coefficient (NTC) resistors configured to compensate for a pole-zero variation of the second-order current sensing circuit caused by thermal factors. For example, the at least two NTC resistors may include an NTC resistor embedded in the controller chip external to the second-order current sensing circuit.

For example, the current measurement may include a total current aggregating the at least two phases. For example, the second-order current sensing circuit may include N current sensing circuits. For example, N may be equal to a number of phases of the TLVR. For example, each of the N current sensing circuits may be configured to couple to one of the N phases of the TLVR. For example, each of the N current sensing circuits may include a positive sense output and a negative sense output of a corresponding phase, such that an in-phase current of the corresponding phase may be determined as a function of the positive sense output and the negative sense output.

For example, the negative sense output of each of the N current sensing circuits may be connected to a common terminal connected to the controller chip.

For example, for each corresponding phase, the positive sense output and the negative sense output may be connected in the controller chip via an on-chip temperature compensated resistor. For example, the on-chip temperature compensated resistor may be configured as a pulling up resistor.

In an illustrative aspect, a power switching regulating system may include a trans-inductor voltage regulator (TLVR) may include N phases, where N>1. For example, each of the at N phases may include a current inducing circuit. For example, the power switching regulating system may include a second-order current sensing circuit operably coupled to the TLVR and configured to measure a current flow at the current inducing circuit.

For example, the TLVR may include a first transfer function including two zeros and one pole. For example, the TLVR may include the second-order current sensing circuit may include a second transfer function may include two DCR-poles and one DCR-zero. For example, a first magnitude difference between the two DCR-poles and the two zeros, and a second magnitude difference between the one DCR-zero and the one pole may be within a predetermined threshold.

The power switching regulating system, for example, may include a controller chip operably coupled to the second-order current sensing circuit and may be configured to receive a current measurement from the second-order current sensing circuit. For example, the controller chip may be configured to generate a phase control signal for each of the N phases based on the current measurement.

For example, the second-order current sensing circuit may include a direct current resistance (DCR) current sensing circuit may include at least two capacitors. For example, the second-order current sensing circuit may include one unit of the DCR current sensing circuit. For example, the one unit of the DCR current sensing circuit may be connected to each of the N phases of the TLVR in parallel.

For example, the current inducing circuit may include a transformer may include a primary side of the transformer coupled to a VOUT terminal of the current inducing circuit. For example, the current inducing circuit may include a secondary side of the transformer may be coupled to a compensation inductor operably coupled to a reference terminal.

For example, the power switching regulating system may include at least two negative temperature coefficient (NTC) resistors configured to compensate for a pole-zero variation of the second-order current sensing circuit caused by thermal factors.

For example, the at least two NTC resistors may include an NTC resistor embedded in a controller chip operably coupled to the second-order current sensing circuit. For example, the current measurement may include a total current aggregating the N phases.

For example, the second-order current sensing circuit may include N current sensing circuits. For example, N may be equal to a number of phases of the TLVR. For example, each of the N current sensing circuits may be configured to couple to one of the N phases of the TLVR. For example, each of the N current sensing circuits may include a positive sense output and a negative sense output of a corresponding phase, such that an in-phase current of the corresponding phase may be determined as a function of the positive sense output and the negative sense output.

For example, the negative sense output of each of the N current sensing circuits may be connected to a common terminal connected to the controller chip. For example, for each corresponding phase, the positive sense output and the negative sense output may be connected in the controller chip via an on-chip temperature compensated resistor. For example, the on-chip temperature compensated resistor may be configured as a pulling up resistor.

A number of implementations have been described. Nevertheless, it will be understood that various modifications may be made. For example, advantageous results may be achieved if the steps of the disclosed techniques were performed in a different sequence, or if components of the disclosed systems were combined in a different manner, or if the components were supplemented with other components. Accordingly, other implementations are contemplated within the scope of the following claims.

What is claimed is:

1. A power switching regulating system comprising:
- a trans-inductor voltage regulator (TLVR) comprises at least two phases, wherein each of the at least two phases comprises a current inducing circuit;
- a second-order current sensing circuit operably coupled to the TLVR and configured to measure a current flow of each of the at least two phases at the current inducing circuit; and,
- a controller chip operably coupled to the second-order current sensing circuit and is configured to:
  - receive a current measurement from the second-order current sensing circuit; and,
  - generate a phase control signal for each of the at least two phases based on the current measurement, wherein:
  - the TLVR comprises a first transfer function comprising two zeros and one pole, and
  - the second-order current sensing circuit comprises a second transfer function comprising two DCR-poles and one DCR-zero, such that a first magnitude difference between the two DCR-poles and the two zeros, and a second magnitude difference between the one DCR-zero and the one pole are within a predetermined threshold, wherein the predetermined threshold is less than 2%.

2. The power switching regulating system of claim 1, wherein the second-order current sensing circuit comprises a direct current resistance (DCR) current sensing circuit comprising at least two capacitors.

3. The power switching regulating system of claim 1, wherein the current inducing circuit comprises a transformer comprising:
- a primary side of the transformer is coupled to a VOUT terminal of the current inducing circuit; and,
- a secondary side of the transformer is coupled to a compensation inductor operably coupled to a reference terminal.

4. The power switching regulating system of claim 1, wherein the power switching regulating system comprises at least two negative temperature coefficient (NTC) resistors configured to compensate for a pole-zero variation of the second-order current sensing circuit caused by thermal factors.

5. The power switching regulating system of claim 4, wherein the at least two NTC resistors comprises an NTC resistor embedded in the controller chip external to the second-order current sensing circuit.

6. The power switching regulating system of claim 1, wherein the current measurement comprises a total current aggregating the at least two phases.

7. The power switching regulating system of claim 1, wherein the second-order current sensing circuit comprises N current sensing circuits, wherein N is equal to a number of phases of the TLVR, and wherein:
- each of the N current sensing circuits is configured to couple to one of the N phases of the TLVR; and,
- each of the N current sensing circuits comprises a positive sense output and a negative sense output of a corresponding phase, such that an in-phase current of the corresponding phase is determined as a function of the positive sense output and the negative sense output.

8. The power switching regulating system of claim 7, wherein the negative sense output of each of the N current sensing circuits are connected to a common terminal connected to the controller chip.

9. The power switching regulating system of claim 7, wherein, for each corresponding phase, the positive sense output and the negative sense output are connected in the controller chip via an on-chip temperature compensated resistor, wherein the on-chip temperature compensated resistor is configured as a pulling up resistor.

10. A power switching regulating system comprising:

a trans-inductor voltage regulator (TLVR) comprises N phases, where N>1, and wherein each of the N phases comprises a current inducing circuit; and, a second-order current sensing circuit operably coupled to the TLVR and configured to measure a current flow at the current inducing circuit, wherein:

the TLVR comprises a first transfer function comprising two zeros and one pole, and the second-order current sensing circuit comprises a second transfer function comprising two DCR-poles and one DCR-zero, such that a first magnitude difference between the two DCR-poles and the two zeros, and a second magnitude difference between the one DCR-zero and the one pole are within a predetermined threshold.

11. The power switching regulating system of claim 10, further comprises a controller chip operably coupled to the second-order current sensing circuit and is configured to:

receive a current measurement from the second-order current sensing circuit; and, generate a phase control signal for each of the N phases based on the current measurement.

12. The power switching regulating system of claim 11, wherein the current measurement comprises a total current aggregating the N phases.

13. The power switching regulating system of claim 11, wherein the second-order current sensing circuit comprises N current sensing circuits, wherein N is equal to a number of phases of the TLVR, and wherein:

each of the N current sensing circuits is configured to couple to one of the N phases of the TLVR; and, each of the N current sensing circuits comprises a positive sense output and a negative sense output of a corresponding phase, such that an in-phase current of the corresponding phase is determined as a function of the positive sense output and the negative sense output.

14. The power switching regulating system of claim 13, wherein the negative sense output of each of the N current sensing circuits are connected to a common terminal connected to the controller chip.

15. The power switching regulating system of claim 14, wherein, for each corresponding phase, the positive sense output and the negative sense output are connected in the controller chip via an on-chip temperature compensated resistor, wherein the on-chip temperature compensated resistor is configured as a pulling up resistor.

16. The power switching regulating system of claim 10, wherein the second-order current sensing circuit comprises a direct current resistance (DCR) current sensing circuit comprising at least two capacitors.

17. The power switching regulating system of claim 16, wherein the second-order current sensing circuit comprises one unit of the DCR current sensing circuit, wherein the one unit of the DCR current sensing circuit is connected to each of the N phases of the TLVR in parallel.

18. The power switching regulating system of claim 10, wherein the current inducing circuit comprises a transformer comprising:

a primary side of the transformer is coupled to a VOUT terminal of the current inducing circuit; and, a secondary side of the transformer is coupled to a compensation inductor operably coupled to a reference terminal.

19. The power switching regulating system of claim 10, wherein the power switching regulating system comprises at least two negative temperature coefficient (NTC) resistors configured to compensate for a pole-zero variation of the second-order current sensing circuit caused by thermal factors.

20. The power switching regulating system of claim 19, wherein the at least two NTC resistors comprises an NTC resistor embedded in a controller chip operably coupled to the second-order current sensing circuit.

* * * * *